(12) United States Patent
Ma et al.

(10) Patent No.: US 8,573,480 B2
(45) Date of Patent: Nov. 5, 2013

(54) CARD ACTIVATED CASH DISPENSING AUTOMATED BANKING MACHINE

(75) Inventors: Songtao Ma, Wadsworth, OH (US); David Vidmar, Wadsworth, OH (US); Michael Russell, Hartville, OH (US); Larry Harmon, Kent, OH (US); Eric Klein, Massillon, OH (US); Jeffery M. Enright, Akron, OH (US); Mike R. Ryan, Canton, OH (US); Wayne Wellbaum, Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 178 days.

(21) Appl. No.: 13/310,858

(22) Filed: Dec. 5, 2011

(65) Prior Publication Data

US 2012/0138676 A1 Jun. 7, 2012

Related U.S. Application Data

(63) Continuation-in-part of application No. 12/802,563, filed on Jun. 9, 2010, now Pat. No. 8,387,865, which is a continuation-in-part of application No. 12/082,755, filed on Apr. 14, 2008, now Pat. No. 7,810,716, which is a continuation of application No. 11/171,647, filed on Jun. 30, 2005, now Pat. No. 7,357,306.

(60) Provisional application No. 61/459,122, filed on Dec. 6, 2010, provisional application No. 61/268,416, filed on Jun. 12, 2009, provisional application No. 60/585,303, filed on Jul. 1, 2004.

(51) Int. Cl.
*G06Q 40/00* (2012.01)

(52) U.S. Cl.
USPC ............ 235/379; 235/375; 235/380; 705/1.1; 705/17; 902/8; 902/12

(58) Field of Classification Search
USPC ......... 235/375, 379, 380; 705/1.1, 17, 18, 19, 705/20, 21, 22, 23, 24, 25; 902/8, 12, 14, 902/15, 16, 17
See application file for complete search history.

*Primary Examiner* — Michael G Lee
*Assistant Examiner* — Tabitha Chedekel
(74) *Attorney, Agent, or Firm* — Black, McCluskey, Souers & Arbaugh, L.P.A.

(57) ABSTRACT

An automated banking machine operates to cause financial transfers responsive to data read from data bearing records. The automated banking machine includes a card reader operative to read card data from user cards corresponding to financial accounts. The automated banking machine also includes a display and a printer to produce records of financial transactions carried out with the machine. The card reader is operative to read and return card information read from the user card responsive. The automated banking machine further includes a sheet detector that is operative to detect at least one property usable to distinguish between the presence or absence of a sheet and/or determine a property of the sheet.

20 Claims, 25 Drawing Sheets

SAMPLE AT 2ms

| Original Outputs | | Adjusted Outputs | | Virtual Amplitude | Original Phase | | Reconstructed Phase | | | | Quadrant |
|---|---|---|---|---|---|---|---|---|---|---|---|
| V1 | V2 | Y1 | Y2 | | PH1 | PH2 | PH1 | PH2 | Y1 | Y2 | |
| 3.009 | 4.933 | 0.502 | 2.463 | 2.514 | 1.370 | 0.201 | 1.370 | -0.201 | + | + | I |

FIG-20

TABLE 1: PHASE RECONSTRUCTION TABLE

| Quadrant | Cycle | $Y_1$ | $Y_2$ | $\Phi_1$ | $\Phi_2$ | Indicator |
|---|---|---|---|---|---|---|
| $III^{-1}$ | -1 | - | - | $-\varphi_1$ | $-\varphi_2 - 2\pi$ | $\varphi_1 + \varphi_2 = 3\pi/2$ |
| $IV^{-1}$ | -1 | + | - | $-\varphi_1$ | $-\varphi_2$ | $\varphi_1 - \varphi_2 = -\pi/2$ |
| I | 0 | + | + | $\varphi_1$ | $-\varphi_2$ | $\varphi_1 + \varphi_2 = \pi/2$ |
| II | 0 | - | + | $\varphi_1$ | $\varphi_2$ | $\varphi_1 - \varphi_2 = \pi/2$ |
| III | 0 | - | - | $2\pi - \varphi_1$ | $\varphi_2$ | $\varphi_1 + \varphi_2 = 3\pi/2$ |
| IV | 0 | + | - | $2\pi - \varphi_1$ | $2\pi - \varphi_2$ | $\varphi_1 - \varphi_2 = -\pi/2$ |
| $I^{+1}$ | 1 | + | + | $2\pi + \varphi_1$ | $2\pi - \varphi_2$ | $\varphi_1 + \varphi_2 = \pi/2$ |
| $II^{+1}$ | 1 | - | + | $2\pi + \varphi_1$ | $2\pi + \varphi_2$ | $\varphi_1 - \varphi_2 = \pi/2$ |
| $III^{+1}$ | 1 | - | - | $4\pi - \varphi_1$ | $2\pi + \varphi_2$ | $\varphi_1 + \varphi_2 = 3\pi/2$ |
| $IV^{+1}$ | 1 | + | - | $4\pi - \varphi_1$ | $4\pi - \varphi_2$ | $\varphi_1 - \varphi_2 = -\pi/2$ |
| $I^{+2}$ | 2 | + | + | $6\pi - \varphi_1$ | $4\pi - \varphi_2$ | $\varphi_1 + \varphi_2 = \pi/2$ |

FIG-22

| Time(ms) | Original Outputs V1 | V2 | Adjusted Outputs Y1 | Y2 | Virtual Amplitude | Original Phase PH1 | PH2 | Reconstructed Phase PH1 | PH2 | Signs Y1 | Y2 | Quadrant |
|---|---|---|---|---|---|---|---|---|---|---|---|---|
| 102 | 3.858 | 4.923 | 1.351 | 2.454 | 2.801 | 1.067 | 0.503 | 1.067 | -0.503 | + | + | I |
| 103 | 3.683 | 4.930 | 1.175 | 2.461 | 2.727 | 1.125 | 0.446 | 1.125 | -0.446 | + | + | I |
| 104 | 3.394 | 4.933 | 0.887 | 2.463 | 2.618 | 1.225 | 0.346 | 1.225 | -0.346 | + | + | I |
| 105 | 2.625 | 4.923 | 0.118 | 2.454 | 2.456 | 1.523 | 0.048 | 1.523 | -0.048 | + | + | I 426 |
| 106 | 1.612 | 4.928 | -0.895 | 2.459 | 2.616 | 1.920 | 0.349 | 1.920 | 0.349 | - | + | II |
| 107 | 1.253 | 4.928 | -1.254 | 2.459 | 2.760 | 2.043 | 0.472 | 2.043 | 0.472 | - | + | II |
| 108 | 0.989 | 4.923 | -1.518 | 2.454 | 2.885 | 2.125 | 0.554 | 2.125 | 0.554 | - | + | II |
| 109 | 1.084 | 4.928 | -1.423 | 2.459 | 2.841 | 2.095 | 0.525 | 2.095 | 0.525 | - | + | II 436 |
| 110 | 1.233 | 4.928 | -1.274 | 2.459 | 2.425 | 2.124 | 0.553 | 2.124 | 0.553 | - | + | II |
| 111 | 1.468 | 4.532 | -1.039 | 2.063 | 1.359 | 2.441 | 0.870 | 2.441 | 0.870 | - | + | II |
| 112 | 1.844 | 3.346 | -0.663 | 0.876 | 0.692 | 2.853 | 1.282 | 2.853 | 1.282 | - | + | II |
| 113 | 2.266 | 2.667 | -0.241 | 0.197 | 0.269 | 3.605 | 2.034 | 3.605 | 2.034 | - | + | III |
| 114 | 2.596 | 2.349 | 0.089 | -0.120 | 0.164 | 5.286 | 2.568 | 5.286 | 3.715 | + | - | IV 456 |
| 115 | 2.801 | 2.332 | 0.294 | -0.137 | 0.295 | 6.215 | 1.639 | 6.215 | 4.644 | + | - | IV |
| 116 | 2.830 | 2.449 | 0.323 | -0.020 | 0.370 | 6.792 | 1.062 | 6.792 | 5.221 | + | - | IV 466 |
| 117 | 2.723 | 2.650 | 0.216 | 0.180 | 0.367 | 7.226 | 0.628 | 7.226 | 5.656 | + | + | I+I 476 |
| 118 | 2.576 | 2.767 | 0.069 | 0.297 | 0.317 | 7.634 | 0.220 | 7.634 | 6.063 | + | + | I+I |
| 119 | 2.488 | 2.779 | -0.019 | 0.310 | 0.191 | 7.952 | 0.098 | 7.952 | 6.381 | - | + | II+I |
| 120 | 2.466 | 2.659 | -0.041 | 0.190 | 0.081 | 8.379 | 0.525 | 8.379 | 6.808 | - | + | II+I |
| 121 | 2.515 | 2.540 | 0.008 | 0.070 | 0.012 | 7.127 | 0.727 | 7.127 | 5.556 | + | + | IV |
| 122 | 2.554 | 2.479 | 0.047 | 0.009 | 0.076 | 0.844 | 2.468 | 5.386 | 3.815 | + | + | IV |
| 123 | 2.601 | 2.410 | 0.094 | -0.059 | 0.113 | 0.897 | 2.171 | 5.683 | 4.112 | + | - | IV |
| 124 | 2.628 | 2.405 | 0.121 | -0.064 | 0.136 | 0.600 | 2.059 | 5.795 | 4.224 | + | - | IV |
| 125 | 2.664 | 2.405 | 0.157 | -0.064 | 0.163 | 0.489 | 1.833 | 6.021 | 4.451 | + | - | IV |
| 126 | 2.694 | 2.427 | 0.186 | -0.042 | 0.189 | 0.262 | 1.405 | 6.449 | 4.878 | + | - | IV |
| 127 | 2.635 | 2.501 | 0.128 | 0.031 | 0.158 | 0.166 | 0.946 | 6.908 | 5.337 | + | + | I+I |
| 128 | 2.567 | 2.562 | 0.059 | 0.092 | 0.100 | 0.625 | 0.639 | 7.215 | 5.644 | + | + | I+I |

FIG-23

CARD ACTIVATED CASH DISPENSING AUTOMATED BANKING MACHINE

CROSS REFERENCE TO RELATED APPLICATIONS

This application is a continuation-in-part of U.S. application Ser. No. 12/802,563 filed Jun. 9, 2010. This application also claims benefit pursuant to 35 U.S.C. §119(e) of Provisional Application No. 61/459,122 filed Dec. 6, 2010.

U.S. application Ser. No. 12/802,563 claims benefit pursuant to 35 U.S.C. §119(e) of Provisional Application No. 61/268,416 filed Jun. 12, 2009. U.S. application Ser. No. 12/802,563 is also a continuation-in-part of U.S. application Ser. No. 12/082,755 filed Apr. 14, 2008, now U.S. Pat. No. 7,810,716.

U.S. application Ser. No. 12/082,755 is a continuation of U.S. application Ser. No. 11/171,647 filed Jun. 30, 2005, now U.S. Pat. No. 7,357,306. application Ser. No. 11/171,647 claims benefit pursuant to 35 U.S.C. §119(e) of Provisional Application No. 60/585,303 filed Jul. 1, 2004.

The disclosures of each of these applications is hereby incorporated herein by reference in their entirety.

TECHNICAL FIELD

This invention relates to automated banking machines that operate to cause financial transfers responsive to data read from data bearing records and which may be classified in U.S. Class 235, Subclass 379.

BACKGROUND

Automated banking machines may include a card reader that operates to read data from a bearer record such as a user card. Automated banking machines may operate to cause the data read from the card to be compared with other computer stored data related to the bearer or their financial accounts. The machine operates in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine shall be deemed to include any machine that may be used to automatically carry out transactions involving transfers of value. Automated banking machines may benefit from improvements.

OBJECTS OF EXEMPLARY EMBODIMENTS

It is an object of an exemplary embodiment to provide an automated banking machine that operates responsive to data read from data bearing records. It is a further object of an exemplary embodiment to provide an apparatus and method of detecting sheets.

It is a further object of an exemplary embodiment to provide an apparatus and method of distinguishing single sheets from multiple overlapped sheets.

It is a further object of an exemplary embodiment to provide an automated banking machine at which a customer may conduct transactions.

It is a further object of an exemplary embodiment to provide an automated banking machine that is operative to accept items of value deposited by the customer.

It is a further object of an exemplary embodiment to provide an automated banking machine that is operative to accept checks deposited by the customer.

It is a further object of an exemplary embodiment to provide an automated banking machine that is operative to determine if a deposited item corresponds to a single sheet or multiple overlapped sheets.

It is a further object of an exemplary embodiment to provide an automated banking machine that is operative to accept currency notes.

It is a further object of an exemplary embodiment that includes a note acceptor that includes a validator that can distinguish between valid and suspect counterfeit notes.

It is a further object of an exemplary embodiment that includes an apparatus that can reliably and cost effectively detect the presence and/or properties of a sheet at areas on a sheet path of an automated banking machine.

Further objects of exemplary embodiments will be made apparent in the following Detailed Description of Exemplary Embodiments and the appended claims.

Certain of the foregoing objects may be accomplished in an example embodiment by an automated banking machine that includes output devices such as a display screen and receipt printer. The machine may further include input devices such as a touch screen, keyboard, keypad, function keys, and card reader. The automated banking machine may further include transaction function devices such as a cash dispenser mechanism for sheets of currency, a depository mechanism and other transaction function devices which are used by the machine in carrying out banking transactions including transfers of value. The computer may be in operative connection with the output devices and the input devices, as well as with the cash dispenser mechanism, depository mechanism and other physical transaction function devices in the banking machine. The computer may further be operative to communicate with a host system located remotely from the machine.

In an exemplary embodiment of the machine, the computer may include software programs that are executable therein. The software programs of the automated banking machine may be operative to cause the computer to output user interface screens through a display device of the machine. The user interface screens may include customer screens which provide a customer with information for performing customer operations such as banking functions with the machine. The user interface screens may further include service screens which provide an authorized user servicing the machine with information for performing service and maintenance operations with the machine. In addition the machine may further include software programs operative in the computer for controlling and communicating with hardware devices of the machine including the transaction function devices.

In an example embodiment, the automated banking machine may include a depository mechanism referred to herein as a sheet or deposit accepting apparatus which is defined herein as any device that accepts one or more sheets such as checks, currency, documents, or other items provided to the machine by a customer. U.S. Pat. No. 6,554,185 B1 which is hereby incorporated by reference herein in its entirety shows an example of a deposit accepting apparatus which may be used in example embodiments of the machine. Such a deposit accepting apparatus may include an inlet that is operative to accept checks, notes or other items being deposited by a customer. Embodiments of the deposit accepting apparatus may be operative to acquire image and magnetic profile data from deposited checks or other items of value. Embodiments of the deposit accepting apparatus may also be operative to manipulate the image and profile data and to analyze and resolve characters in selected areas thereof. The data from the deposited item may be used for determining if the user is authorized to conduct certain requested transactions at the machine.

The automated banking machine and/or the deposit accepting apparatus may include a detector apparatus which may be used by the machine and/or the deposit accepting apparatus to determine if the deposited media corresponds to a single sheet or multiple overlapped sheets. The detector apparatus may be operative to transmit a sound signal through the deposited media. For example, the deposit accepting apparatus may include a transport which moves the media along a pathway which is alternatively referred to herein as a sheet path. The detector apparatus may include an ultrasonic sound transmitter which is also referred to herein as an emitter positioned on one side of the pathway and an ultrasonic sound receiver positioned on the opposite side of the pathway. Deposited sheet media such as a check or a note may be moved along the sheet path by the transport in the gap between the ultrasonic transmitter and the ultrasonic receiver. The ultrasonic receiver may produce at least one receiver signal responsive to the ultrasonic sound signal received from the transmitter. The at least one receiver signal may be conditioned such as by being filtered and analyzed by circuitry included in connection with the detector to determine an amount of phase delay produced in the sensed ultrasonic sound signal as a result of sheet media passing through the gap.

The detector apparatus may include circuitry having orthogonal correlation filters. A first one of the correlation filters may be fed the receiver signal generated by the ultrasonic receiver and a first reference signal. The second one of the correlation filters may be fed the receiver signal and a second reference signal. The first and second reference signals for the filters may have a frequency which corresponds to the frequency of the originally transmitted ultrasonic sound signal. In addition, the second reference signals may have a phase which lags the phase of the first reference signal by a known amount, such as $\pi/2$ radians (ninety degrees). As defined herein correlation filters correspond to circuitry which is operative to provide output signals which include information regarding a difference in phase between a receiver signal and a reference signal. Also as defined herein, two correlation filters which receive respective reference signals which in the exemplary embodiment differ in phase by $\pi/2$ radians, are referred to as orthogonal correlation filters. In an example embodiment the orthogonal correlation filters are operative to output respective signals which include information regarding a phase differential between the receiver signal and the respective reference signals which range from 0 to $\pi$ rad (0 to 180 degrees).

The outputs of the two correlation filters may be sampled at a frequency which is sufficiently high to distinguish the gradual change in phase over time of the ultrasonic sound signal from a time before the item passes through the gap between the transmitter and receiver to a time when portions of the item are passing through the gap between the transmitter and the receiver. By monitoring the gradual change in phase angle differentials reflected in both of the outputs of the correlation filters, the example detector apparatus circuitry may be operative to reconstruct data representative of a phase delay greater than $\pi$ radians (180 degrees) which may be produced by multiple overlapped sheets. The detector apparatus may be operative responsive to the reconstructed phase angles to reliably distinguish single sheets from double, triple and/or other multiples of sheets.

When the example detector apparatus determines that media in the detector corresponds to multiple overlapped sheets, the deposit accepting apparatus may be operative to cause the transport of the apparatus to return the sheets to the user through an opening in the banking machine and/or to activate portions of the transport that may be operative to attempt to separate the overlapped checks. When the detector determines that the media corresponds to a single sheet, the automated banking machine may be operative through operation of the deposit accepting apparatus to cause a sheet depositing transaction to be performed.

In an example embodiment of the automated banking machine, the sheet depositing transaction may include initiating the crediting of an account associated with the user of the machine with an amount of value associated with a check or a currency note. The sheet depositing transaction may further include moving the sheet with the transport into a reservoir or temporary or permanent storage area in the machine for storing deposited sheets of the particular type.

In another example embodiment the automated banking machine includes a note acceptor. The note acceptor is operative to enable the machine to receive currency notes from users. The note acceptor includes at least one validator. The at least one validator is operative to produce signals and/or data responsive to sensing properties of notes that are usable to determine if a note is a valid note or a suspect counterfeit note or other sheet.

In an exemplary embodiment the at least one validator includes an ultrasonic detector. The at least one ultrasonic detector is operative to produce at least one signal which corresponds to properties of sonic transmission through the sheet. The signals transmitted through the sheet may correspond to thickness and/or density. In an exemplary embodiment at least one computer in the automated banking machine is operative to analyze data corresponding to the at least one signal and to determine if the at least one signal corresponds to a genuine note and/or a suspect counterfeit note. In the exemplary embodiment the at least one computer is operative to identify a sheet having at least one seam that corresponds to a sheet that was likely produced by combining other sheets such as portions of genuine notes. Such a mosaic note which includes portions of genuine notes may include portions of such genuine notes that may cause the counterfeit note to appear to be a valid note to certain validators within the note acceptor.

In some example embodiments the at least one validator may operate using the data corresponding to signals from the ultrasonic detector to identify probable seams or other properties that correspond to suspect counterfeit notes. In still other embodiments the at least one validator may include an imaging sensor that is operative to produce image data that is analyzed for purposes of identifying features of counterfeit notes such as seams. In still other embodiments at least one validator in the note acceptor may include one or more radiation transmission sensors that are operative to pass radiation through a note. The at least one computer in the machine may operate responsive to data produced by some or all of these sensors of the one or more validators for purposes of determining whether a sheet received by a note acceptor is a genuine note or a suspect counterfeit note.

In an exemplary embodiment, the automated banking machine includes a sheet detector that is operative to detect at least one property usable to distinguish between the presence or absence of a sheet. A waveguide is operatively connected to the sheet detector. The waveguide is operative to guide a signal emitted by the sheet detector to an area on a sheet path. A computer is operative to determine the presence or absence of a sheet positioned at the area on the sheet path responsive at least in part to an output signal from the sheet detector. The output signal from the detector corresponds to data from the signal emitted by the sheet detector interacting with the area on the sheet path.

Of course the principles described herein may be used in many different devices, systems and processes to achieve beneficial results.

BRIEF DESCRIPTION OF DRAWINGS

FIG. 20 is a table showing examples of data values measured and calculated associated with a single sample detected by the detector during a no-sheet condition of the detector.

FIG. 22 is a table showing information usable by the detector to determine reconstructed phase angles from calculated original phase angles.

FIG. 23 is a table showing examples of data values measured and calculated associated with a set of samples detected by the detector during a time period before a triple overlapped sheet reaches the detector to a time while the triple overlapped sheet is passing through the detector.

DETAILED DESCRIPTION OF EXEMPLARY EMBODIMENTS

Figure 1:
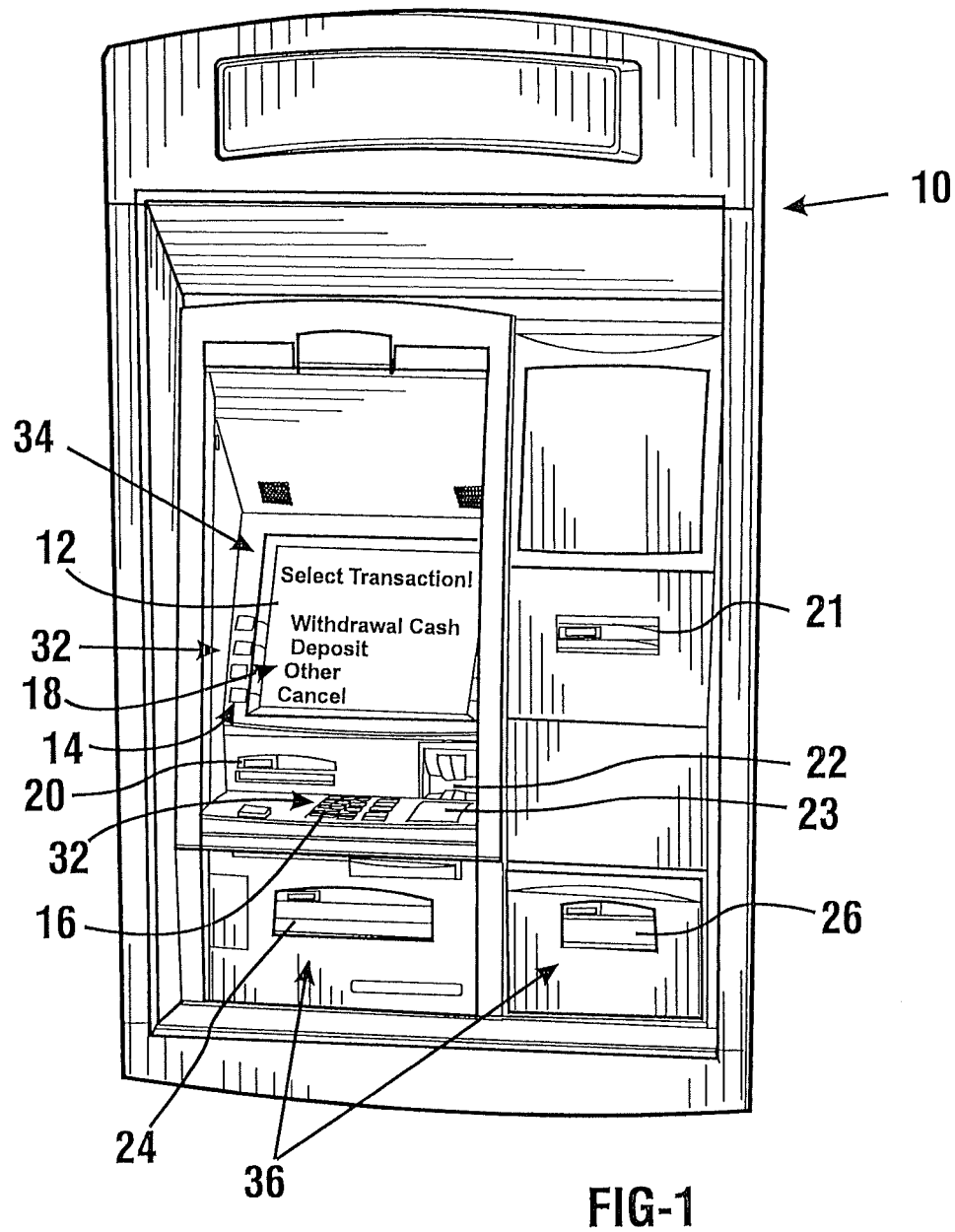
FIG. 1 is a perspective view representative of an example embodiment of an automated banking machine.

Referring now to the drawings and particularly to FIG. 1, there is shown therein a perspective view of an example embodiment of an automated banking machine 10. Here the automated banking machine 10 may include at least one output device 34 such as a display device 12. The display device 12 may be operative to provide a consumer with a user interface 18 that may include a plurality of screens or other outputs including selectable options for operating the machine. An embodiment of the automated banking machine may further include other types of output devices such as a receipt printer 20, statement printer 21, speakers, or any other type of device that is capable of outputting visual, audible, or other sensory perceptible information.

The example embodiment of the automated banking machine 10 may include a plurality of input devices 32 such as an encrypting pin pad with keypad 16 and function keys 14 as well as a card reader 22. The example embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The example embodiment of the automated banking machine 10 may further include a plurality of transaction function devices which may include for example a cash dispenser 24, a depository mechanism 26 (also referred to herein as a sheet or deposit accepting apparatus), cash recycler mechanism (which also corresponds to a deposit accepting apparatus), or any other type of device which is operative to perform transaction functions involving transfers of value.

In an exemplary embodiment the card reader is operative to read data from user cards that correspond to a financial account. In exemplary embodiments the card reader may be operative to read magnetic stripe data from user cards. In other embodiments the card reader may be operative to read data from a card such as a radio frequency identification (RFID) card or data stored on a chip such as a smart card. Further in other embodiments the card reader may be operative to read optical media, electronic media or other stored data which is usable to identify a user and/or a user's financial account.

In some exemplary embodiments the automated banking machine may include features and structures such as those described in U.S. Pat. Nos. 7,156,296; 7,156,297; 7,165,767; and/or 7,000,830, the entire disclosures of each of which are incorporated herein by reference. In some embodiments the automated banking machine may include features of cash dispensers, sheet dispensers or other devices such as those described in U.S. Pat. Nos. 7,244,132; 7,322,481; 7,121,461; 7,131,576; 7,140,537; 7,144,006; 7,140,607; 7,004,383; 7,000,832; 6,874,682; and/or 6,634,636, the entire disclosures of each of which are incorporated herein by reference. Further some embodiments may include depository devices such as those described in U.S. Pat. Nos. 7,156,295; 7,137,551; 7,150,394; 7,021,529; 5,540,425; U.S. application Ser. No. 12/288,205 filed Oct. 17, 2008 or U.S. Application Ser. No. 61/192,282 filed Sep. 17, 2008, the entire disclosures of each of which are incorporated herein by reference in their entirety. Further other embodiments may include devices with features such as those described in U.S. Pat. Nos. 6,983,880; 6,109,522; 7,213,476; 6,109,522; 6,227,446; 6,302,393; 6,331,000; and/or U.S. patent application Ser. No. 11/983,410 filed Nov. 8, 2007, the disclosures of each of which are incorporated herein by reference in their entirety.

Figure 2:
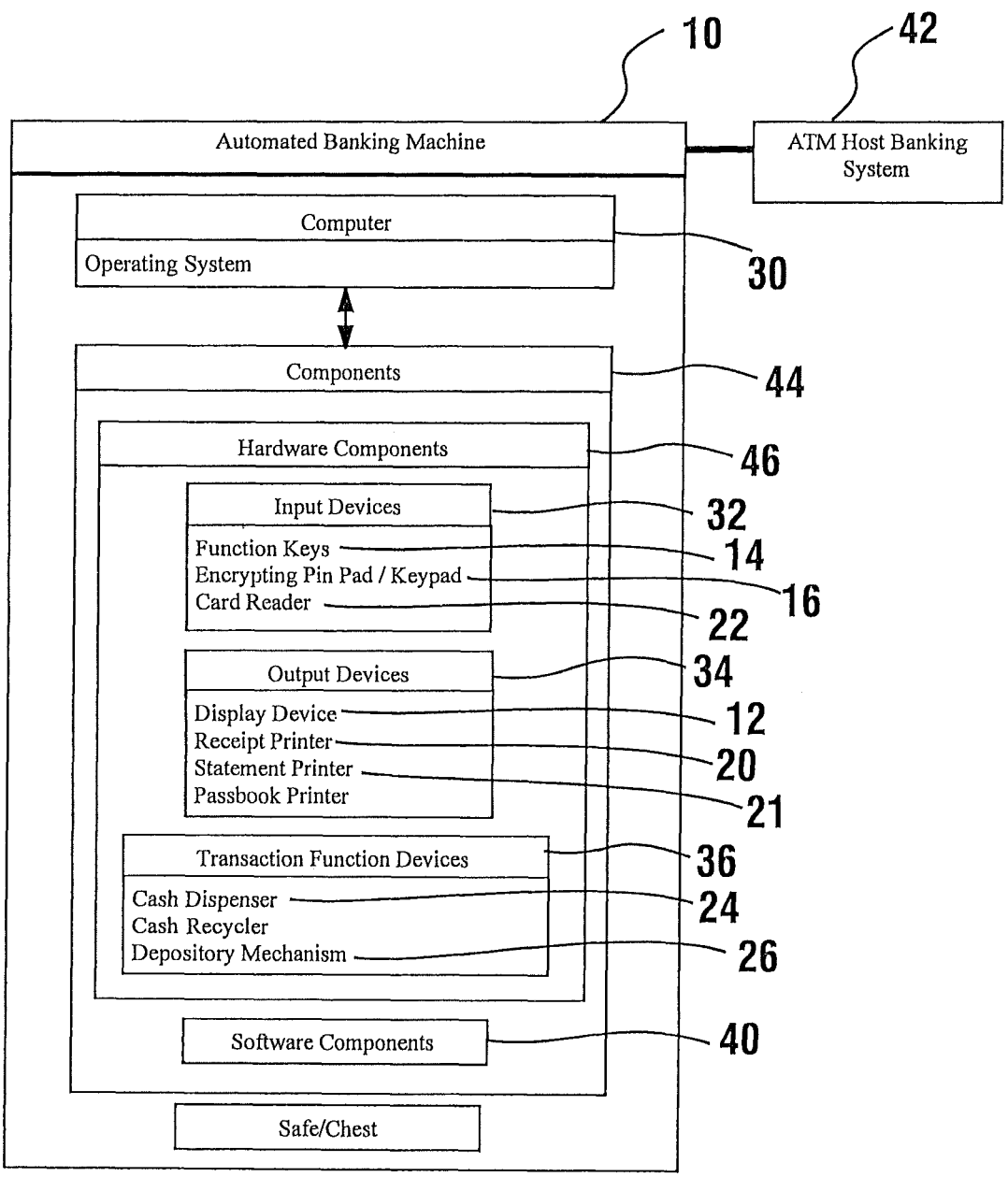
FIG. 2 is a schematic view of a further example embodiment of an automated banking machine.

FIG. 2 shows a schematic view of components which may be included in the automated banking machine 10. The machine 10 may include at least one computer 30. A computer may be alternatively referred to herein as a processor. The term computer or processor when used herein will also be deemed to include any electronic circuitry or device that can execute program instructions, including but not limited to a field programmable gate array, an integrated circuit or a microprocessor. The computer 30 may be in operative connection with the input device(s) 32, the output device(s) 34, and the transaction function device(s) 36. The example embodiment may further include at least one terminal control software component 40 operative in the computer 30. The terminal control software components may be operative to control the operation of the machine by both a consumer and an authorized user such as a service technician. For example, such terminal control software components may include applications which enable a consumer to dispense cash, deposit a check, deposit currency notes, or perform other transaction functions with the machine. In addition the terminal control software components may include applications which enable a service technician to perform configuration, maintenance and diagnostic functions with the machine.

Example embodiments of the automated banking machine 10 may be operative to communicate with a transaction processing server which is also referred to herein as an automated banking machine host banking system 42. Such an automated banking machine host banking system 42 may be operative in conjunction with the automated banking machine 10 to cause financial transfers and perform transaction functions at the machine for users such as withdrawing cash from an account corresponding to card data through operation of the cash dispenser 24, depositing checks or other items with the deposit accepting apparatus 26, accepting notes using a note acceptor, performing a balance inquiry for a financial account and transferring value between accounts.

Some exemplary machines and systems may include features such as those described in U.S. Pat. Nos. 6,264,101; 6,131,809; 7,159,144; 7,162,449; 7,093,749; 7,039,600; 7,261,626; 7,333,954; 7,379,893; 7,366,646; 7,104,441; 7,163,144; 7,093,749; 6,953,150; 7,147,147; 6,289,320; and/or U.S. patent application Ser. No. 12/075,236 filed Mar. 10, 2008, the disclosures of each of which are incorporated herein by reference in their entirety.

Figure 3:
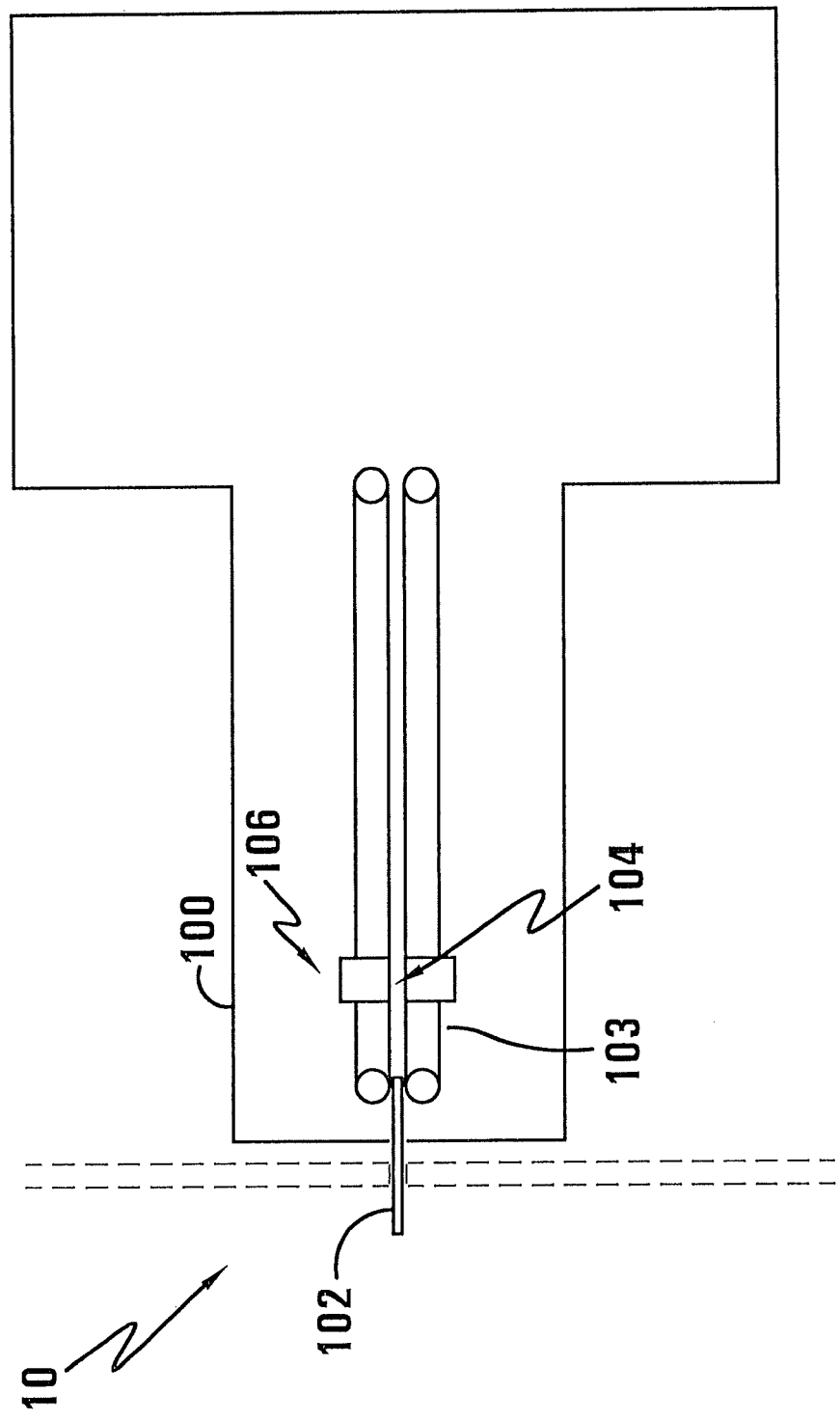
FIG. 3 is a cross-sectional view of an example embodiment of a deposit accepting apparatus with a detector apparatus operative to distinguish single sheets from multiple overlapped sheets.

FIG. 3 shows an example of a deposit accepting apparatus 100 for an embodiment of the automated banking machine 10. Here the deposit accepting apparatus 100 is operative to accept individual sheets such as checks 102, or other documents such as currency, bills (which are alternatively referred to herein as notes), vouchers, coupons, tickets or other items of value. The example deposit accepting apparatus may include a transport 103 which moves a check inserted by a customer along a path or a pathway 104 within the deposit accepting apparatus.

Figure 4:
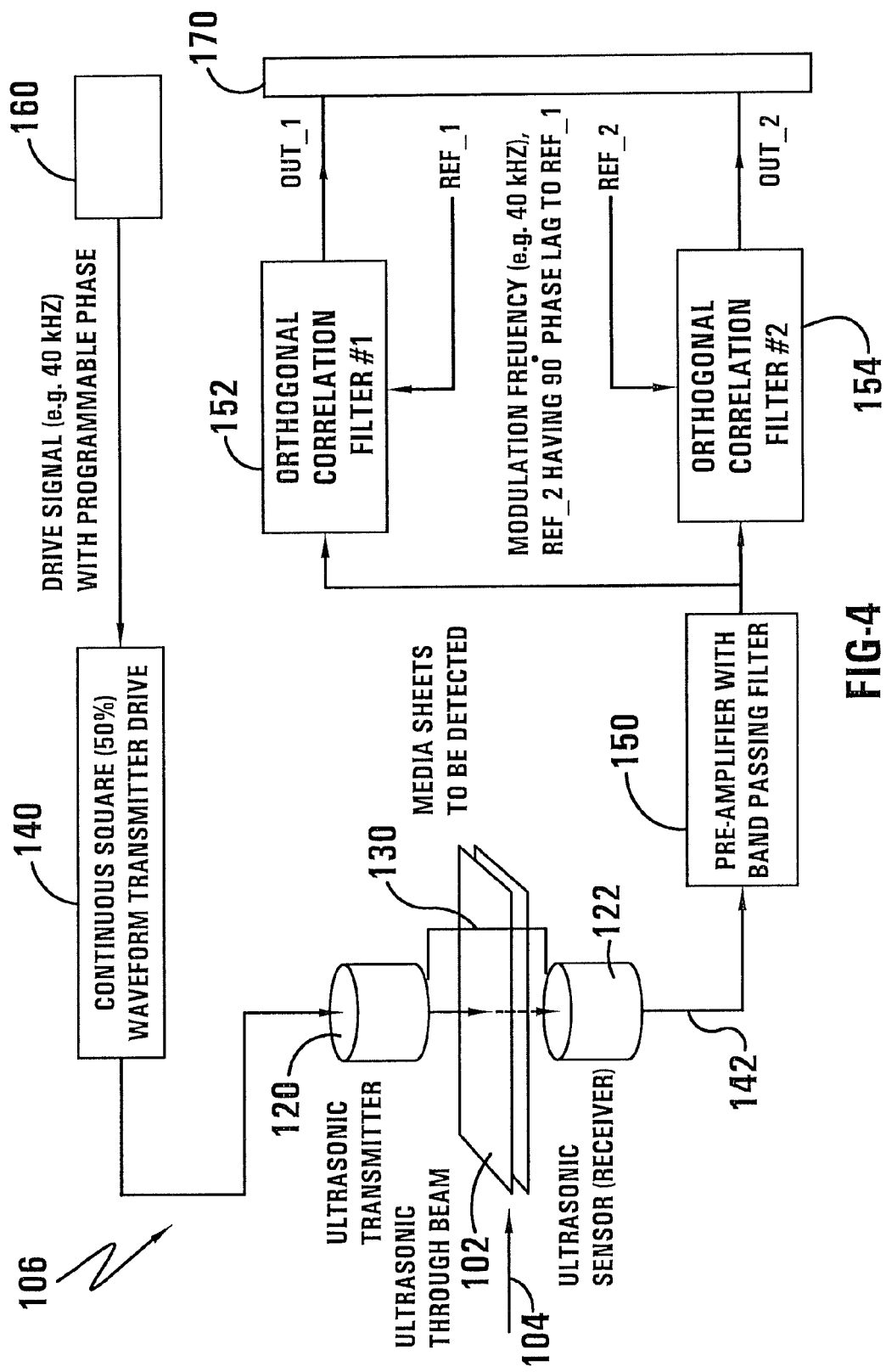
FIG. 4 is a schematic view of an example embodiment of an ultrasonic detector that is operative to distinguish single sheets from multiple overlapped sheets.

In this described embodiment, the deposit accepting apparatus may include a detector 106 adjacent the pathway which is operative to distinguish between single sheets and multiple overlapped sheets moving through the pathway. FIG. 4 shows a schematic view of the detector 106. Here the detector includes an ultrasonic sound transmitter also referred to as an emitter 120 and an ultrasonic sound sensor also referred to as a receiver 122. The transmitter and receiver may be spaced apart and positioned on opposite sides of a sheet path which comprises the pathway 104 to form a gap 130 through which the sheet passes as it moves along the sheet path. The transmitter may be orientated to output an ultrasonic sound signal in a direction that traverses the gap. The receiver may be aligned with the transmitter on the opposite side of the gap so as to receive the ultrasonic sound signal after passing through the pathway and any sheets present in the gap. The receiver may be orientated to output the ultrasonic sound signal in a direction that is substantially perpendicular with respect to a plane which includes an upper or lower face of the sheet.

The acoustic impedance of the gap changes when sheets of paper such as checks are inserted into the gap. This change produces extra phase delay in the ultrasonic sound signal per inserted sheet layer, plus amplitude attenuation inversely proportional to the number of layers and the total thickness of the sheets. The number of overlapped sheets in the sensor gap may be determined from the amount of phase delay in the ultrasonic sound signal after passing through the sheet(s). Alternative embodiments may further base determinations as to the number of overlapped sheets on both phase delay and the attenuation of the ultrasonic sound signal.

In an example embodiment of the detector, a driving signal 140 applied to the transmitter 120 may have a square waveform with a 50% duty cycle. Also, in this described embodiment the driving signal may be 20V peak to peak with a frequency of about 40 kHz to produce a 40 kHz ultrasonic sound signal. However, in other alternative embodiments, driving signals with other waveforms, amplitudes, and frequencies may be used depending on the type of transmitter, expected range of properties of the sheet media, the acoustical characteristic of the detector and the desired acoustical characteristics of the ultrasonic sound signal. As used herein an ultrasonic sound signal is defined as a sound wave with a frequency greater than 20 kHz. However, it is to be understood that alternative embodiments may include detectors which operate using sound waves with frequencies at or lower than 20 kHz depending on the acoustical sound characteristics of the detector and sheet media being detected.

In example embodiments of the detector, the receiver signal 142 produced by the receiver responsive to the ultrasonic sound signal received from the transmitter, may be conditioned using detector circuitry including a pre-amplifier with band-passing filter 150. The conditioned receiver signal may be fed into first and second correlation filters 152, 154 along with reference signals with known frequencies and phases.

Figure 5:
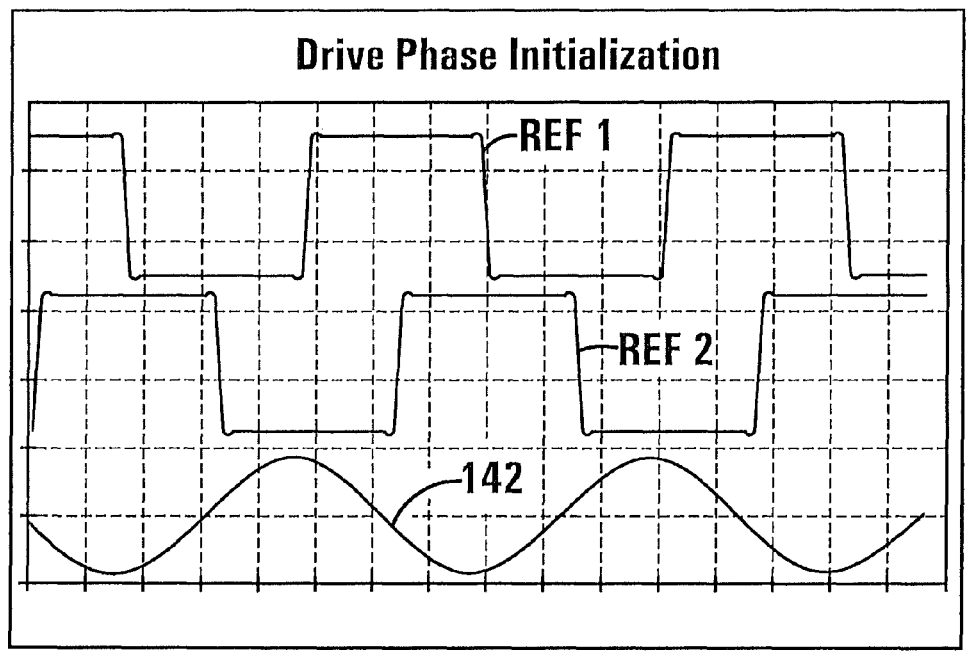
FIG. 5 is a graph showing examples of the wave forms for first and second reference signals and a signal generated by an ultrasonic receiver.

In example embodiments of the detector, modulation (chopping) frequency reference signals REF_1, REF_2 are fed into the first and second correlation filters 152, 154 respectively. The reference signals REF_1 and REF_2 may be of the same frequency (40 kHz) as the transmitter drive signal waveform. In this described embodiment, the second reference signal REF_2 has a phase which lags behind the first reference signal REF_1 by a quarter cycle of the driving frequency, which corresponds to $\pi/2$ radians or 90 degrees. FIG. 5 shows a graph with plots corresponding to examples of a receiver signal 142 produced by the ultrasonic receiver, the first reference signal REF_1, and the second reference signal REF_2.

Referring back to FIG. 4, in an example embodiment of the detector, the driving waveform may be produced by a programmable or configurable drive circuit 160 which enables the amplitude of the driving signal to be adjusted in order to compensate for loop gain variations due to sensor pair sensitivity and possible aging. In addition the drive circuit may enable the (initial) phase of the drive signal to be adjusted with respect to the reference signals to compensate for the variations in sensor pair, mechanical mounting and gap width of the detector. The drive circuit may include one or more processors which are alternatively referred to herein as computers.

In an example embodiment, the detector may comprise circuitry including one or more processors and may be operative to determine a baseline or origin of detection for the ultrasonic sound signal when no sheet media is present in or near the gap 130 of the detector. When sheet media is present in the gap, the detector may be operative to determine the amount of phase delay in the ultrasonic sound signal caused by the sheet media. The amount of phase delay caused by the sheet media may be determined by a processor 170 of the detector responsive to the two outputs OUT_1 and OUT_2 produced by the first and second correlation filters 152, 154 respectively. The amount of phase delay may be used by the detector to determine if the sheet media passing through the gap corresponds to a single sheet or multiple sheets. Generally speaking, the more layers of media sheets in the sensing gap, the more phase delay it produces.

In this example, a phase delay which is caused by a single sheet may range between 0 and $\pi$ rad. High numbers of multiple sheets may cause a phase delay that is greater than $\pi$ rad. In an example embodiment of the detector apparatus, the outputs of the correlation filters correspond to the differences in phase up to $\pi$ radians between the receiver signal and the respective reference signals. Because the outputs of each correlation filter may correspond to phase angles which range from only 0 to $\pi$ rad, high numbers of multiple sheets may produce phase angles differentials as measured by each correlation filter which correspond to the phase angle differentials of a single or low number of multiple sheets.

For example, a single (only one check or other sheet) may produce an average phase delay in the ultrasonic sound signal of about $0.5\pi$ rad. A double (two overlapped checks or other sheets) may come close to producing a phase delay in the ultrasonic sound signal of $\pi$ rad. A triple (three overlapped checks or other sheets) may produce a phase delay in the ultrasonic sound signal of around $1.5\pi$ rad. However, because of the limited range of the phase angle differentials (0 to $\pi$) as measured by the correlation filters, a phase angle differential for the triple and a phase angle differential for a single may both be around $0.5\pi$ rad. As will be discussed in more detail below, an example embodiment of the detector is responsive to the outputs of both correlation filters to determine or reconstruct corresponding phase delay information for multiple sheets which may be greater than $\pi$ rad.

Figure 6:
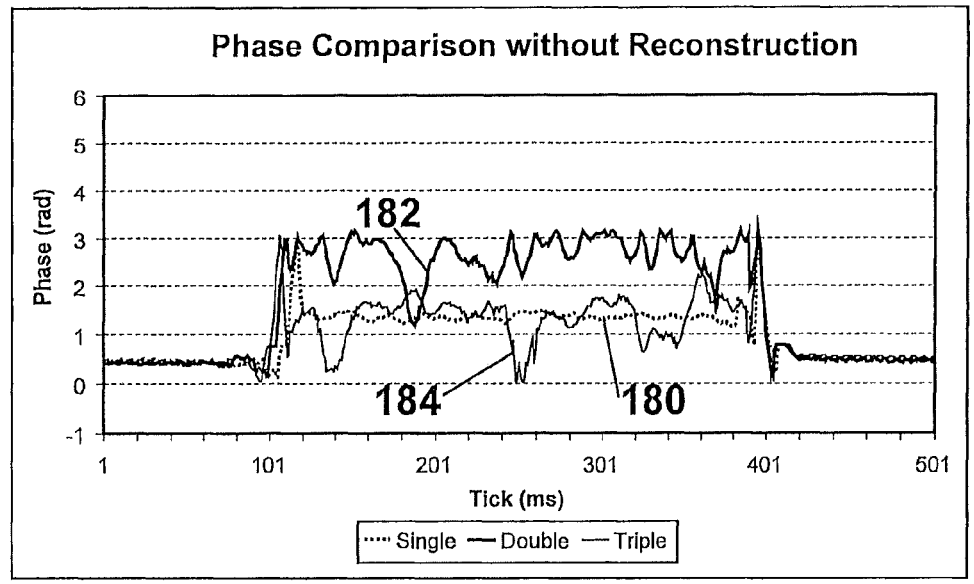
FIG. 6 is a graph showing examples of original phase angles produced by a detector for single, double and triple sheets passing through the detector.

FIG. 6 shows a graph of plots for the differential phase angles determined using the correlation filters for a single 180, double 182, and triple 184. Notice that the phase angles for the single 180 and the triple 184 substantially overlap, making it difficult to distinguish between the presence of a single or triple by the detector with phase angle differential information from the correlation filters.

Figure 7:
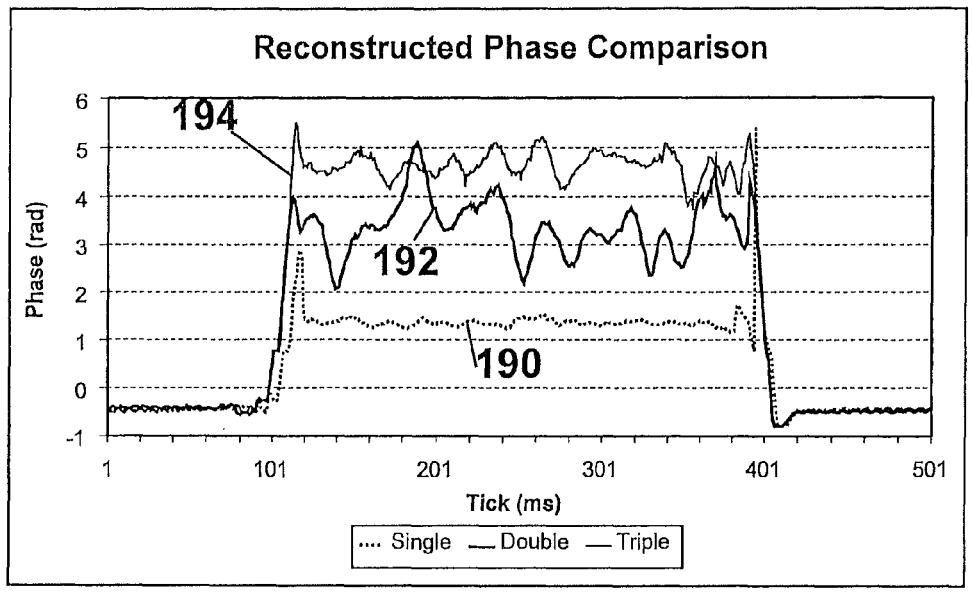
FIG. 7 is a graph showing examples of reconstructed phase angles produced by a detector for single, double and triple sheets passing through the detector.

FIG. 7 shows a graph of plots for the reconstructed phase delay determined by an embodiment of the detector for a single 190, double 192, and triple 194. Here the reconstructed phase delay for the triple 194 no longer overlaps with the reconstructed phase delay for a single 190. Consequently the detector may more accurately distinguish between single and multiple overlapped sheets responsive to the reconstructed phase delay determined by the detector.

Figure 8:
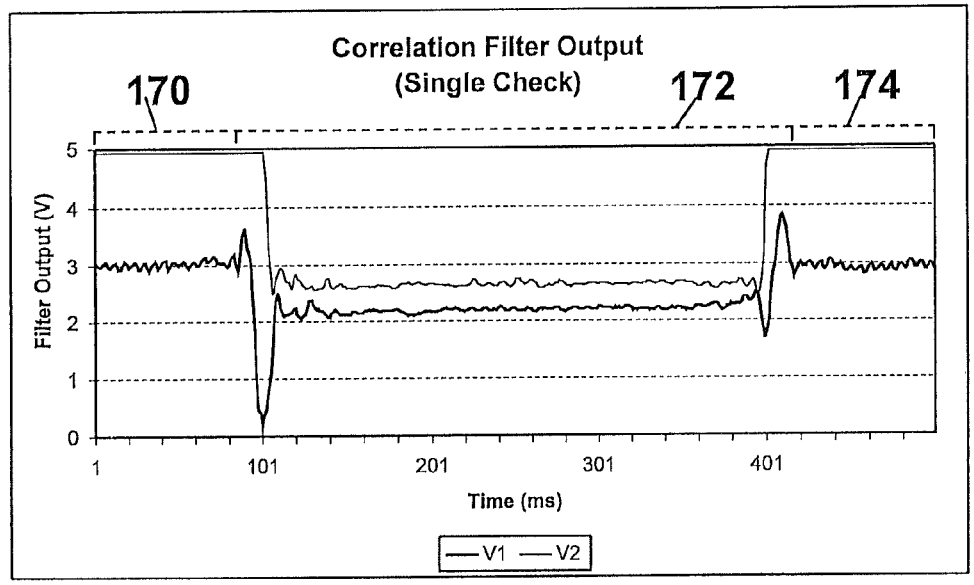
FIG. 8 is a graph showing examples of outputs from two correlation filters for a single sheet passing through the detector.

FIG. 8 shows a graph which includes plots for the outputs OUT_1, OUT_2 (in Volts) of the first and second correlation filters for an example embodiment of the detector. The plots begin during a period of time 170 before a check reaches the gap between the transmitter and receiver and shows the period of time 172 while the check is being transported through the gap and the period of time 174 after the check has left the gap. In this described embodiment, the transport of the deposit accepting apparatus moves the check at about 500 mm/sec and the detector samples the outputs from the correlation filters at about a 1 kHz sampling rate.

As used herein, the condition of the detector when there is no sheet or other media present in or near the gap between the transmitter and receiver is referred to as the "no-sheet condition." As shown in FIG. 8, for the no-sheet condition (at times less then 87 ms or greater than 412 ms) the second correlation filter produces an output signal between about 4.92 and 4.93 volts which corresponds to about its saturation level. For the same time periods the first correlation filter produces an output signal between about 2.90 and 3.16 volts.

In this described embodiment, the saturated or maximum voltage values (e.g., 5 volts) produced by the correlation filters occurs when the phases of the receiver signal and the respective reference signal coincide. The voltage outputs from the correlation filters decrease to a minimum level (e.g., about zero) when the phases of the receiver signal and the respective reference signal are offset by about $\pi$ rad. Thus, as the ultrasonic sound signal passes through one or more sheets in the gap between the emitter and receiver, the corresponding voltage values from the correlation filters change between maximum and minimum values (5 to 0 volts) in response to the phase of the receiver signal changing with respect to the phases of the reference signals.

For example, when the edge of the check reaches the gap (after about 95 ms), the phase of the ultrasonic sound signal begins to fluctuate and as a result the voltage outputs from the correlation filters fluctuate. As more of the interior body of the check moves into the gap (between about 120 and 380 ms), the phase of the ultrasonic sound signal becomes relatively more stable compared to the edges of the check, resulting in filter output voltages generally between 2.1-2.3 volts for the first correlation filter and generally between 2.5-2.7 volts for the second correlation filter.

In this described embodiment, after the check moves out of the detector and the gap is only filled with air (the no sheet condition), the phase delay of the ultrasonic sound signal decreases and the voltage outputs of the correlation filters return to the levels measured at the beginning of the plot prior to the check entering the gap.

To determine the reconstructed phase delay, the detector may be operative to adjust the output voltages responsive to predetermined offset values according to equations 1 and 2.

$$y_1 = v_1 - o_1 \quad (EQ1)$$

$$y_2 = v_2 - o_2 \quad (EQ2)$$

Here the Adjusted Voltages (y1 and y2) are Calculated by Subtracting the Offset Voltages (o1 and o2) from the original voltages (v1 and v2) produced by the first and second correlation filters respectively. Although the above equations show an example of subtraction, it is to be understood that as used herein subtraction may also correspond to adding one value to a negative of another value.

In certain example embodiments of the detector, such offset values may be chosen so as to place the midpoint between the highest (saturated) output for each correlation filter and its respective lowest level output, at about a zero level. For example, if the output range of each correlation filter is between 0 and 5 volts, then an offset voltage of 2.5 volts may be chosen for each correlation filter. This offset voltage may be subtracted from each of the sampled outputs from the correlation filters to produce a set of bipolar adjusted output voltages.

Figure 9:
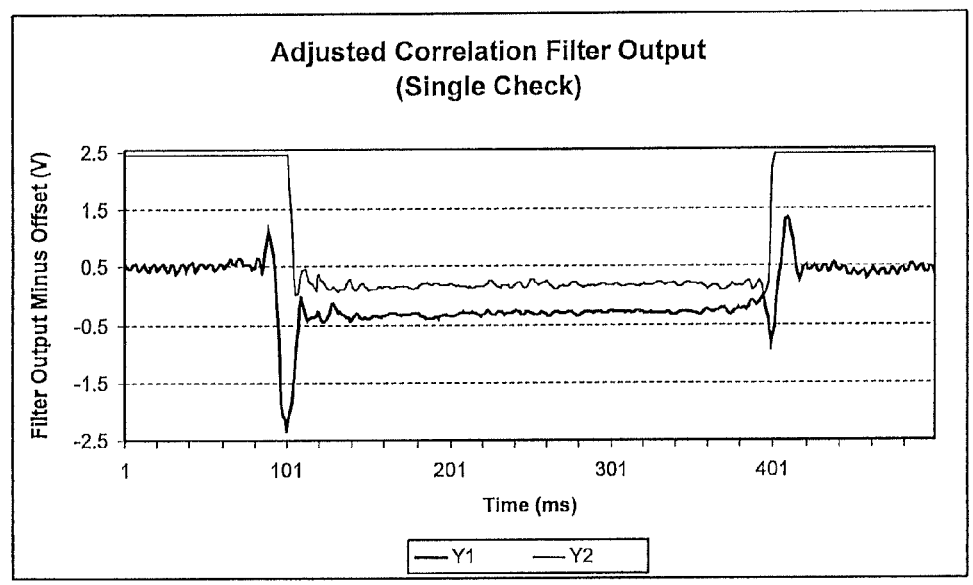
FIG. 9 is a graph showing examples of adjusted outputs from two correlation filters for a single sheet passing through the detector.

FIG. 9 shows plots for the adjusted output voltages which correspond to the plots of the original output voltages shown in FIG. 8 reduced by determined offset voltage values. Here the offset voltage for the first correlation filter was determined to be about 2.507 volts and the offset voltage for the second correlation filter was determined to be about 2.470 volts. As a result of the subtraction of these offset voltage values from the outputs of the corresponding correlation filters, the adjusted outputs may range between positive and negative values depending on the amount of phase angle differential between the receiver signal and the respective reference signal.

To further the determination of the reconstructed phase delay, embodiments of the detector may calculate virtual amplitude values responsive to the adjusted output voltage values. Such a calculation for a virtual amplitude may be performed according to equation 3.

$$A = \sqrt{y_1^2 + y_2^2} \quad (EQ3)$$

Figure 10:
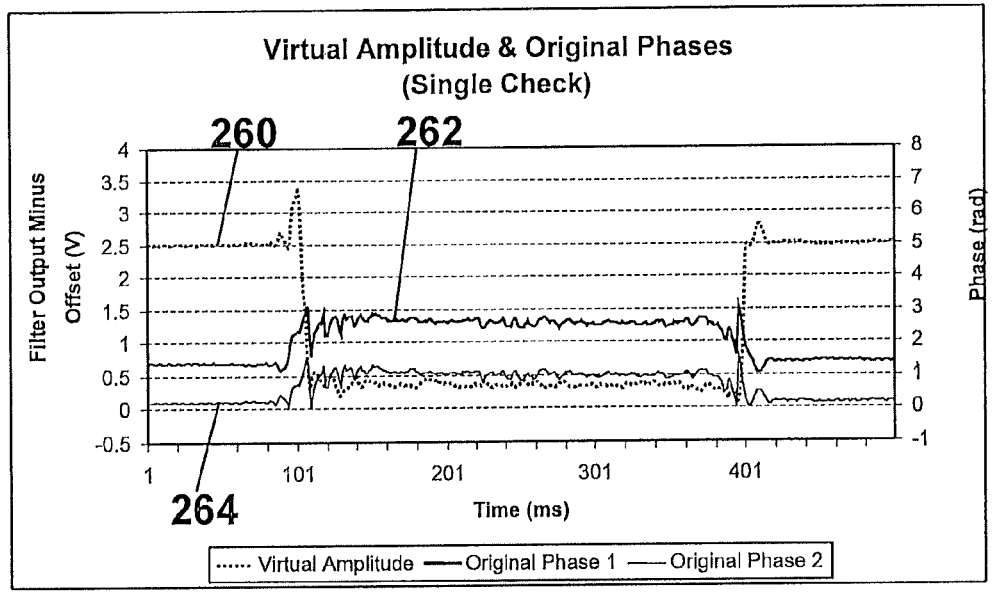
FIG. 10 is a graph showing examples of calculated original phases associated with each correlation filter and a calculated virtual amplitude for a single sheet passing through the detector.
Figure 11:
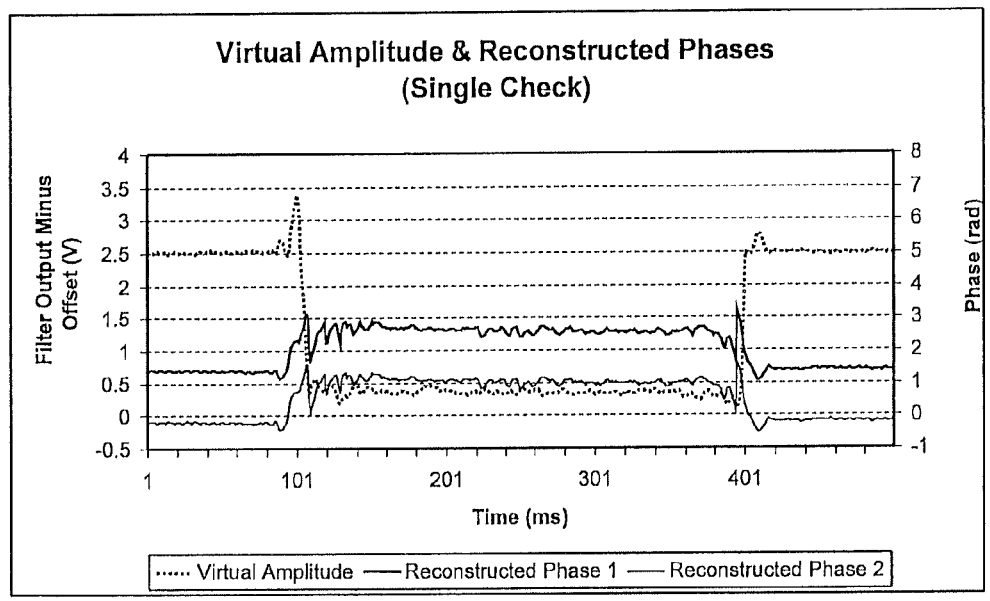
FIG. 11 is a graph showing examples of reconstructed phases associated with each correlation filter and the calculated virtual amplitude for a single sheet passing through the detector.

Here A corresponds to the virtual amplitude and $y_1$ and $y_2$ correspond to adjusted output voltages for the first and second correlation filters respectively. FIG. 10 shows a graph which includes a plot 260 of the calculated virtual amplitudes derived from the adjusted output voltages shown in FIG. 9.

As used herein, the phase angle differentials corresponding to the outputs of the correlation filters are referred to as original phase angles. Such original phase angles may be calculated for the adjusted outputs of at least one of the correlation filters responsive to equations 4 and/or 5.

$$\varphi_1 = \arccos \frac{y_1}{A} \quad (EQ\ 4)$$

$$\varphi_2 = \arccos \frac{y_2}{A} \quad (EQ\ 5)$$

Here $\phi_1$ and $\phi_2$ correspond to the original phases in radians which may be determined by calculating the arccos of the result of the division of the adjusted output voltages ($y_1$ and $y_2$) for the first and second correlation filters respectively by their corresponding virtual amplitude.

In addition to showing a plot of the virtual amplitude 260, FIG. 10 also shows the plots 262, 264 for the calculated original phase angles which correspond to the first and second adjusted output voltages shown in FIG. 9 for the first and second correlation filters respectively.

Figure 12:
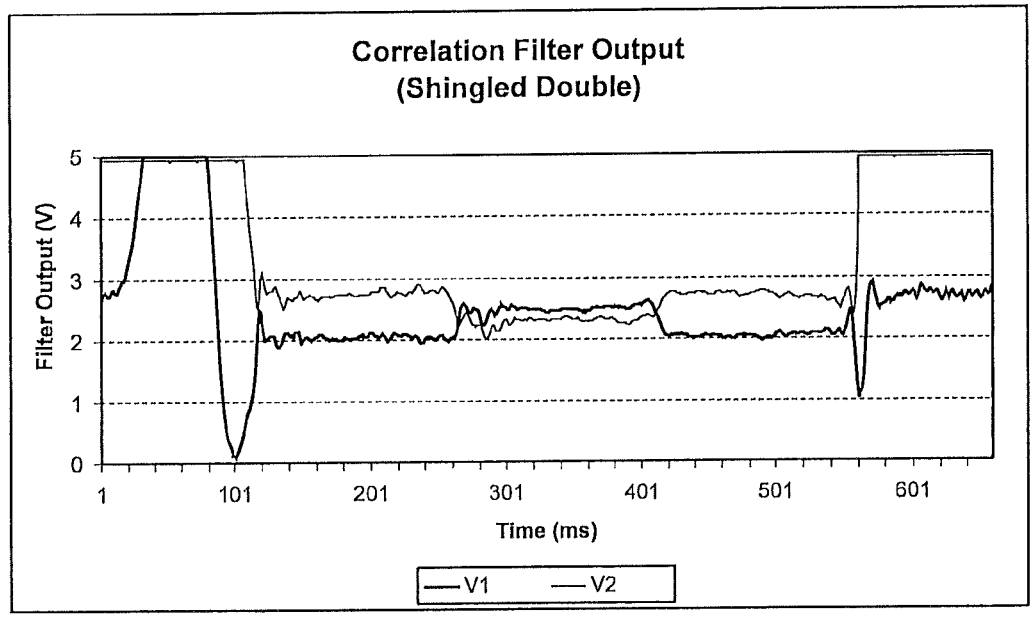
FIG. 12 is a graph showing examples of outputs from two correlation filters for a shingled double sheet passing through the detector.
Figure 13:
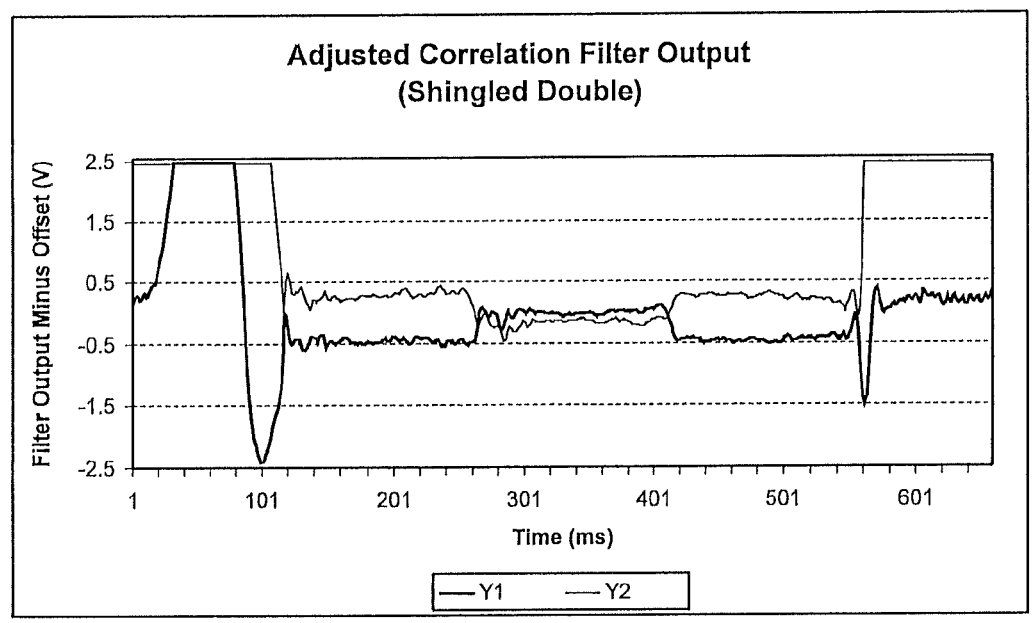
FIG. 13 is a graph showing examples of adjusted outputs from two correlation filters for a shingled double sheet passing through the detector.
Figure 14:
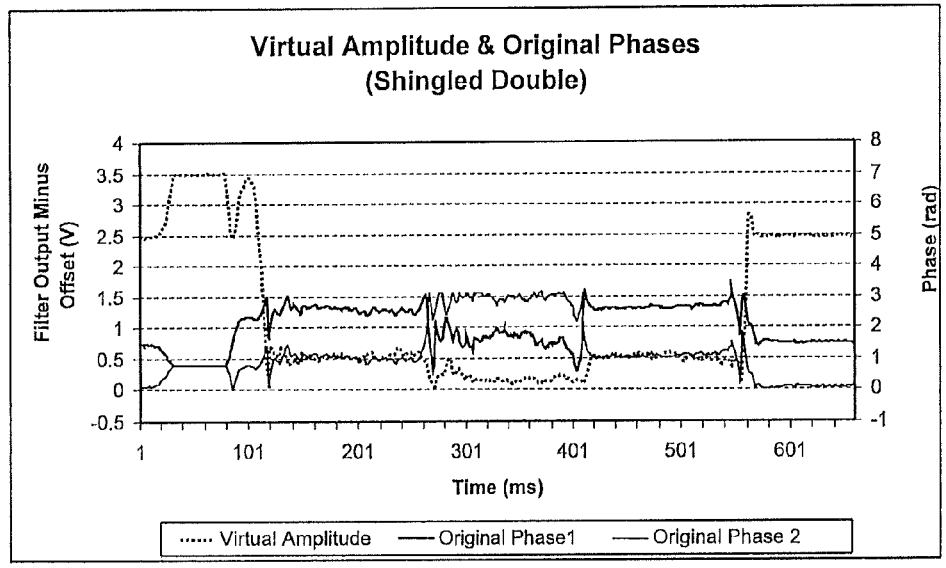
FIG. 14 is a graph showing examples of calculated original phases associated with each correlation filter and a calculated virtual amplitude for a shingled double sheet passing through the detector.
Figure 15:
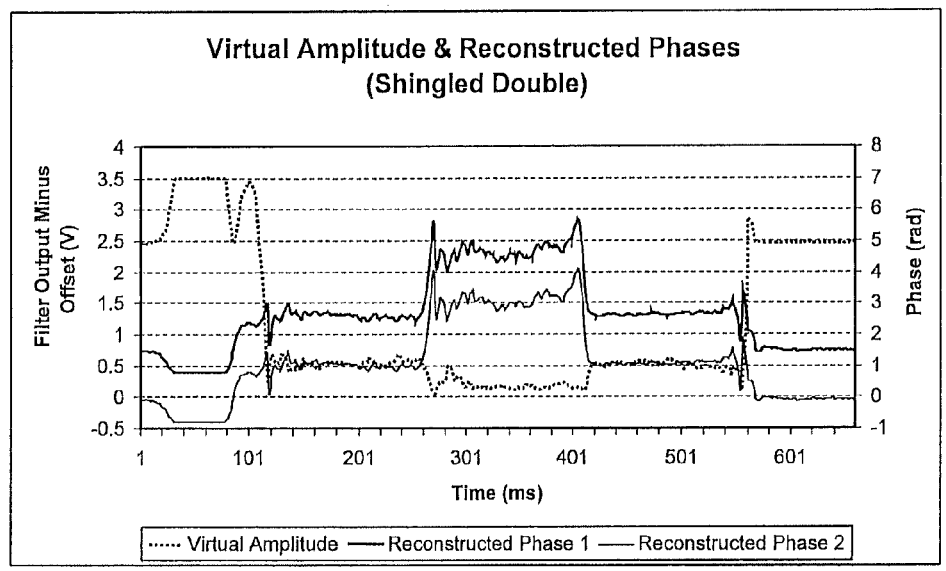
FIG. 15 is a graph showing examples of reconstructed phases associated with each correlation filter and the calculated virtual amplitude for a shingled double sheet passing through the detector.
Figure 16:
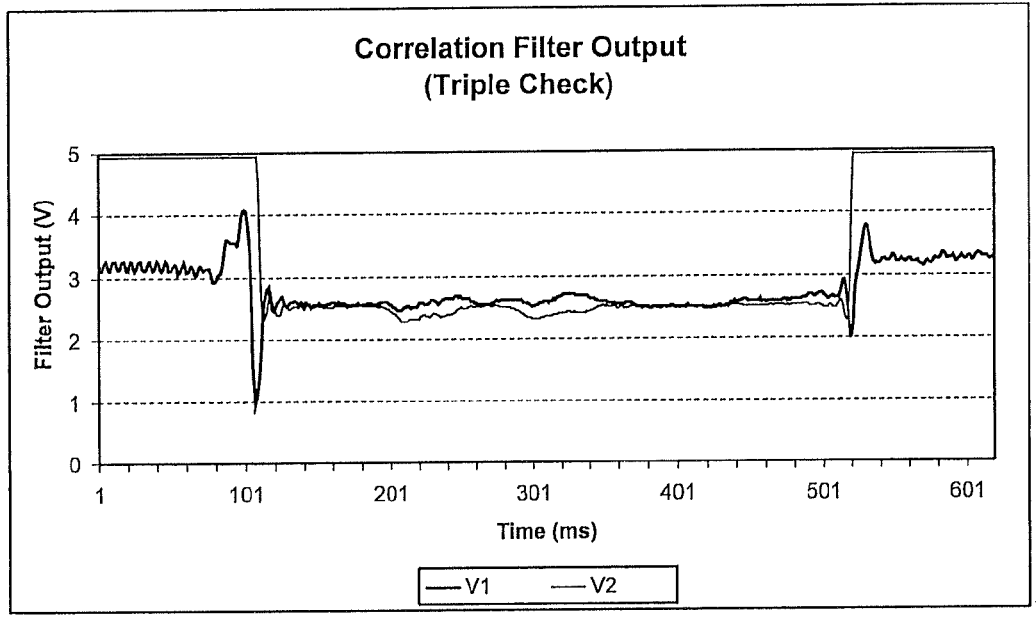
FIG. 16 is a graph showing examples of outputs from two correlation filters for three overlapped sheets passing through the detector.
Figure 17:
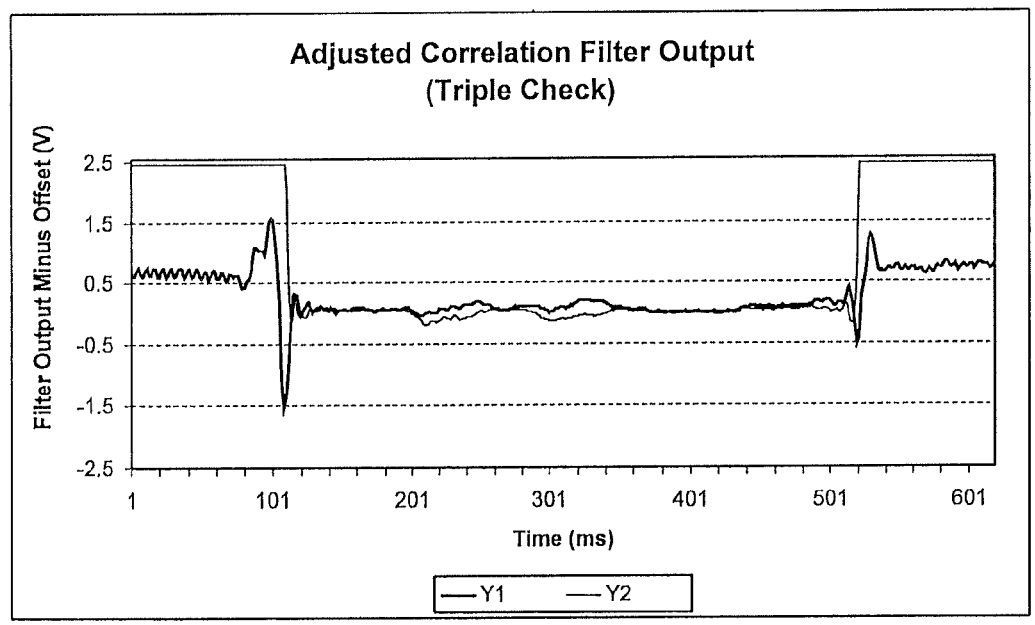
FIG. 17 is a graph showing examples of adjusted outputs from two correlation filters for three overlapped sheets passing through the detector.
Figure 18:
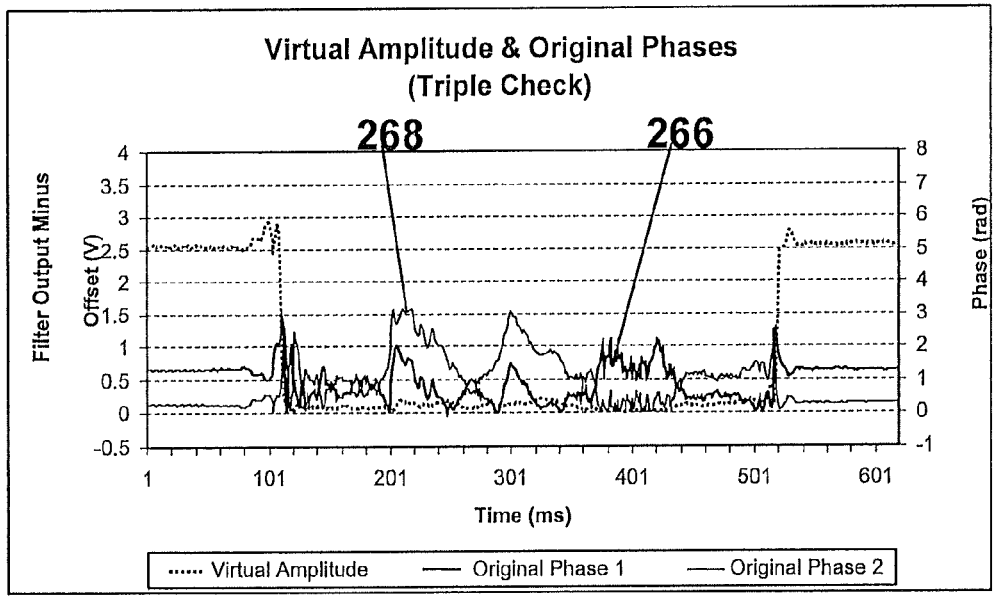
FIG. 18 is a graph showing examples of calculated original phases associated with each correlation filter and a calculated virtual amplitude for three overlapped sheets passing through the detector.
Figure 19:
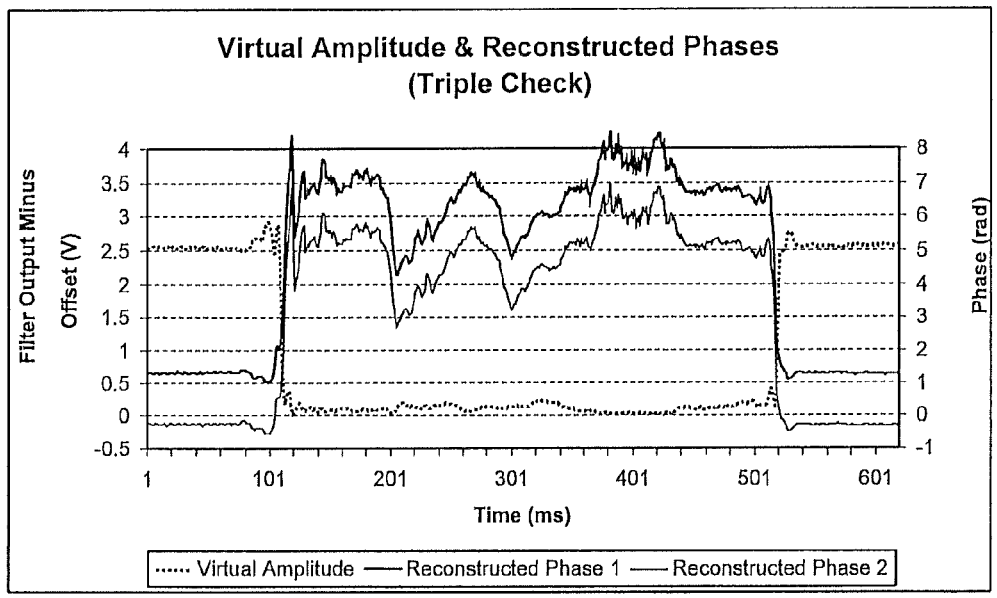
FIG. 19 is a graph showing examples of reconstructed phases associated with each correlation filter and the calculated virtual amplitude for three overlapped sheets passing through the detector.

For the described embodiment, FIGS. 8-10 show plots associated with a single sheet passing through the detector. FIGS. 12-14 show corresponding plots for the case in which the sheet passing through the detector is partially folded over to form a two-layer overlapped portion (referred to herein as a shingled double). FIGS. 16-18 show corresponding plots for the case in which three overlapping sheets (referred to herein as a triple) passes through the detector.

As discussed previously, the original phase angles calculated from the outputs of the correlation filters range between 0 and $\pi$ rad. Thus, even though the actual phase delay of the ultrasonic sound signal may be greater than $\pi$ radians for the case of a triple, the original first and second phase angles 266, 268 calculated from the first and second correlation filters and shown in FIG. 18 for a triple are less then $\pi$ rad. As a result the original phase angles calculated for a triple (FIG. 18) are relatively similar to the original phase angles calculated for a single (FIG. 10), making it difficult to distinguish between a triple and a single based only on the calculated original phase angles.

Thus to uncover phase delay information that is greater than $\pi$ radians from original phase angles that do not exceed $\pi$ rad, the embodiment of the detector is operative to map the original phase angles to reconstructed phase angles, which may include angles greater than π rad.

In this described embodiment, the reconstructed phase angles may be determined by evaluating the incremental changes in the signs of the adjusted outputs as a sheet passes through the gap between the transmitter and receiver. Such an evaluation may be performed in view of the fact that the reconstructed phase angles for the second correlation filter must lag behind the reconstructed phase angles for the first correlation filter by π/2. This relationship between original phases for the two correlation filters occurs as a result of the detector producing the second reference signal REF_2 with a phase that lags behind the phase of the first reference signal REF_1 by π/2.

FIG. 20 shows a table 300 which includes the corresponding correlation filter outputs 310, 312 (in volts), adjusted outputs 314, 316, virtual amplitude 308, and calculated original phase angles 302, 306 (in radians) represented in the plots for FIGS. 8-10 for an output sample from the correlation filters at 2 ms. This sample is during the no-sheet condition of the detector. Similar measurements and calculated values are also produced by the detector in the no-sheet conditions shown in plots for FIGS. 12-14 and 16-18.

As shown in FIG. 20, the original phase angles 302, 306 for the first and second correlation filters are 1.370 radians and 0.201 radians respectively. In this described embodiment the detector is operative to determine that the corresponding reconstructed phase values 304, 308 are 1.370 radians and −0.201 radians respectively. Formulas for mapping the original phase angles to corresponding reconstructed phase angles may vary depending on the reconstructed phase angle determined for the preceding sample and depending on the changes in signs of the adjusted outputs from the previous sample to the current sample.

Figure 21:
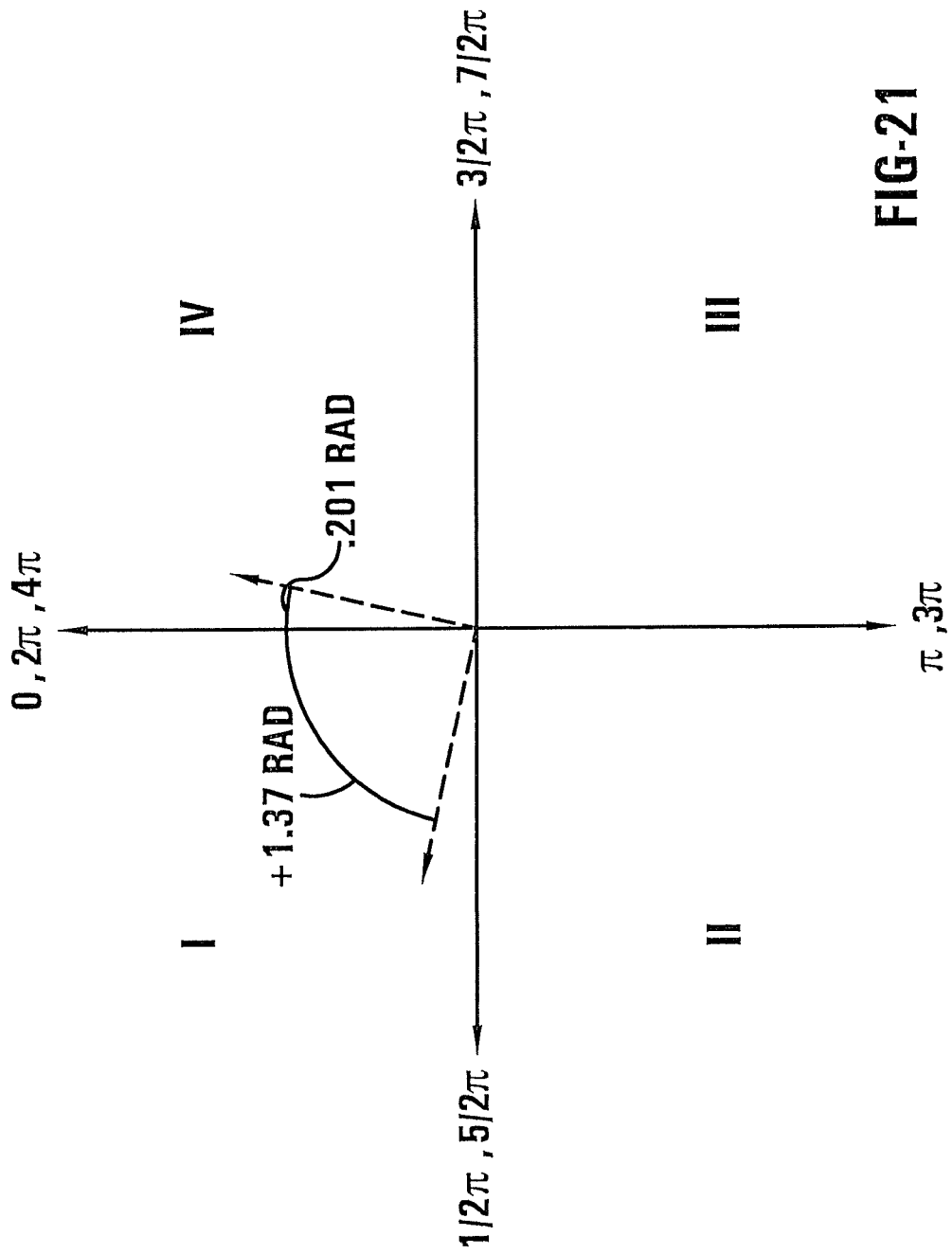
FIG. 21 is an example of a four-quadrant graph showing the positions of the reconstructed phase angles for the single sample.

As shown in FIG. 21, a graph which plots phase angles may be divided into four ninety degree (π/2 radians) quadrants (I, II, III and IV) which increase in a counter-clockwise sequence. The first quadrant (I) ranges between 0 and π/2 radians. The second quadrant (II) ranges from π/2 radians to π radians. The third quadrant (III) ranges from π radians to 3π/2 radians. The fourth quadrant (IV) ranges from 3π/2 radians to 2π radians.

If the reconstructed phase for the first correlation filter were plotted on such a four-quadrant graph, the reconstructed phase angle 304 of 1.370 radians for the first correlation filter would fall in the first quadrant (I) as shown in FIG. 21. In addition, the reconstructed phase angle 308 of −0.201 radians for the second correlation filter would fall in the fourth quadrant (IV) and lags reconstructed phase angle of the first correlation filter by about π/2 radians.

In this described embodiment, while the detector remains in the no-sheet condition, the correlation filters will continue to generate voltage values corresponding to the voltage values 310, 312 shown in FIG. 20. However, when the edge of the sheet reaches the detector (around 95 ms) the ultrasonic phase delay begins to fluctuate and the corresponding output voltages fluctuate. The described embodiment of the detector is operative to sample the outputs of the correlation filters at a sufficiently high rate (1 kHz) to track the change in the adjusted outputs and/or corresponding original phase angles with sufficient resolution to detect the gradual movement in reconstructed phase angle from one quadrant to an adjacent quadrant. As a result, the reconstructed phases corresponding to each sample will fall in either the same quadrant as the preceding sample or will fall in one of the adjacent quadrants as the phase of the ultrasonic sound signal fluctuates in response to sheet media in the detector. For example, as shown in FIG. 21, if the preceding sample has a reconstructed phase angle found in the first quadrant (I), the reconstructed phase angle of the next sample from the same correlation filter will either remain in the first quadrant (I) or increase to fall in the second quadrant (II) or decrease to fall in the fourth quadrant (IV).

In this described embodiment, the sample rate is sufficiently high to minimize the opportunity for the reconstructed phase angles to change to a non-adjacent quadrant compared to the preceding reconstructed phase angle. Thus, if the preceding sample has a reconstructed phase angle found in the first quadrant (I), the reconstructed phase angle of the next sample for the same correlation filter should not fall in the third quadrant (III).

As shown in FIG. 21, as the phase delay of an ultrasonic sound signal increases with media in the detector from 0 to 2π rad, a plot of the changing reconstructed phase will theoretically move from the first quadrant (I) to the second quadrant (II), then from the second quadrant (II) to the third quadrant (III), then from the third quadrant (III) to the fourth quadrant (IV). After the fourth quadrant (IV) the reconstructed phase will once again follow through the four quadrants (I through IV) as the phase delay of the ultrasonic sound signal increases from 2π to 4π.

The table shown in FIG. 22 lists quadrants 484 in which the reconstructed phase angles (for the first correlation filter) may move through with the insertion of one or more sheets in the detector. A first set 402 of quadrants (I to IV) is listed without a superscript and correspond to the first cycle around the graph the reconstructed phase angles for the first correlation filter may move through.

When the reconstructed phase angle increases and moves through the four quadrants (I to IV) a second or third time/cycle the second or third sets of quadrants 404, 406 are listed with a +1 or +2 superscript respectively in the table. Correspondingly if the reconstructed phase were to move in the opposite direction from the initial first quadrant I to the fourth quadrant IV, the table lists the set 408 of the preceding set of quadrants with a −1 superscript.

In example embodiments of the detector, the phase of the drive signal relative to the phases of the reference signals may be set/adjusted by the hardware of the detector to place the minimum reconstructed phase delay for the first correlation filter in the first quadrant (I) for the no-sheet condition. However, because the second reference signal lags the first reference signal by π/2, in the no-sheet condition, the reconstructed phase angle for the second correlation filter will fall in the fourth quadrant with an associated negative superscript $(IV^{-1})$ FIG. 23 shows a table of values associated with the detection of a triple. These values are represented in graphs 16-20 and correspond to the time period between 102-128 ms. This time period represents a period that starts before a triple overlapped sheet reaches the detector and ends while a portion of the triple is within the gap of the detector.

An initial set 502 of the samples corresponds to the time period during the no-sheet condition of the detector. In this initial set of samples, the signs 414, 416 of the first and second adjusted outputs 418, 419 respectively are positive (+,+). The process of reconstructing phase angles begins with the predetermined knowledge (as set by the hardware) that when in the no-sheet condition, the positive pair of signs (+,+) of the adjusted outputs corresponds to reconstructed phase angles for the first correlation filter falling in the first quadrant (I). FIG. 22 reflects this association in row 403 which associates the first quadrant (I) with a pair of positive signs (+,+). In addition, FIG. 22 also associates with each quadrant corresponding equations 420 usable to map original phase angles to reconstructed phase angles.

For example, the row 403 associated with the first quadrant (I) and the sign pair (+,+) in FIG. 22 indicates the following equations 6 and 7 are usable by the detector to map the original phase angles to reconstructed phase angles for the first and second correlation filters respectively.

$$\Phi_1 = \phi_1 \quad (EQ6)$$

$$\Phi_2 = \phi_2 \quad (EQ7)$$

Here the variables $\phi_1$ and $-\phi_2$ represent the original phase angles for the first and second correlation filters respectively for a sample and the variables $\Phi_1$ and $\Phi_2$ represent the reconstructed phase angles for the first and second correlation filters respectively.

Referring back to FIG. 23, for the sample at 105 ms, the original phase angles 420, 424 for the first and second correlation filters are 1.53 radians and 0.048 radians respectively. Responsive to equation 6 and 7, these original phase angles may be mapped to the reconstructed phase angles of 1.53 radians and –0.048 radians respectively.

As discussed previously, the signs 422, 426 associated with the adjusted outputs 420, 424 for the 105 ms sample are both positive (+,+). However, the following sample at 106 ms, has an adjusted output 430 associated with the first correlation filter which now has a negative sign 432 while the adjusted output 434 associated with the second correlation filter continues to have a positive sign 436. The corresponding pair of signs for the 106 ms sample is thus negative and positive (–,+).

This change of sign of one of the adjusted outputs from the 105 ms sample to the 106 ms sample indicates that the reconstructed phase for the first correlation filter (and the second) has moved to a new quadrant (likely as a result of the edge of the triple coming close to the gap or moving into the gap of the detector).

To determine which quadrant, the detector may be operative to analyze the current sample and the preceding sample using a firmware or software program which is configured to be responsive to portions of the information represented in FIG. 22. For example, the detector may include a program that is operative to determine that the preceding sample (at 105 ms) has a reconstructed phase angle for the first correlation filter that was in the first quadrant (I). Such a program may also determine that of the adjacent quadrants ($IV^{-1}$ or II) to the first quadrant (I), the signs (–,+) of the current sample (106 ms) correspond to the signs (–,+) associated with the second quadrant (II) and not the signs (+,–) associated with the fourth quadrant $IV^{-1}$.

Based on the determination that the current sample (106 ms) should have a reconstructed phase angle for the first correlation filter that is now in the second quadrant (II), the following equations 8 and 9 may be used to map the original phase angles 410, 412 to corresponding reconstructed phase angles 411, 413:

$$\Phi_1 = \phi_1 \quad (EQ8)$$

$$\Phi_2 = \phi_2 \quad (EQ9)$$

Responsive to these equations, the original phase angles of 1.920 radians and 0.349 radians for the sample at 106 ms (FIG. 23) may be mapped to the reconstructed phase angles of 1.920 radians and 0.349 radians respectively.

As shown in FIG. 23, the samples from 106 ms to 112 ms have associated sets of signs 414, 416 for the first and second adjusted outputs which continue to correspond to negative and positive values (–,+) respectively. However, the following sample at 113 ms, has an adjusted output 454 associated with the second correlation filter which now has a negative sign 436 while the adjusted output 452 associated with the first correlation filter continues to have a negative sign 436. The corresponding pair of signs for the 113 ms sample is thus negative and negative (–,–).

This change in signs from the 112 ms sample to the 113 ms sample indicates that the reconstructed phase for the first correlation filter (and the second) has again moved to a new quadrant. To determine which quadrant, the detector may be operative to again analyze the current sample and the preceding sample responsive to portions of the information represented in FIG. 22.

For example, the program instructions executed through operation of at least one processor associated with the detector may be operative to determine that the preceding sample (112 ms) has a reconstructed phase angle for the first correlation filter that was in the second quadrant (II). Such program instructions may also determine that of the adjacent quadrants (I or III) to the second quadrant (II), the signs (–,–) of the current sample (113 ms) correspond to the signs (–,–) associated with the third quadrant (III) and not the signs (+,+) associated with the first quadrant (I).

Based on the determination that the current sample (113 ms) should have a reconstructed phase angle for the first correlation filter that is in the third quadrant (III), the following equations 10 and 11 may be used to map the original phase angles to the reconstructed phase angles:

$$\Phi_1 = 2\pi - \phi_1 \quad (EQ10)$$

$$\Phi_2 = \phi_2 \quad (EQ11)$$

Responsive to these Equations, the Original Phase Angles of 2.679 Radians and 2.034 Radians for the sample at 113 ms (FIG. 23) may be mapped to the reconstructed phase angles of 3.605 radians and 20.34 radians respectively.

Continuing down the table in FIG. 23, the following sample at 114 ms has an adjusted output 460 associated with the first correlation filter which now has a positive sign 462 while the adjusted output 464 associated with the second correlation filter continues to have a negative sign 466. The corresponding pair of signs for the 114 ms sample is thus positive and negative (+,–).

This change in sign from the 113 ms sample to the 114 ms sample indicates that the reconstructed phase angle for the first correlation filter (and the second) has again moved to a new quadrant. To determine which quadrant, the detector may be operative to analyze the current sample and the preceding sample responsive to portions of the information represented in FIG. 22.

For example, the program instructions associated with the detector may be operative to determine that the preceding sample (113 ms) had a reconstructed phase angle for the first correlation filter that was in the third quadrant (III). The program instructions may also determine that of the adjacent quadrants (II or IV) to the third quadrant (III), the signs (+,–) of the current sample (114 ms) correspond to the signs (+,–) associated with the fourth quadrant (IV) and not the signs (–,+) associated with second quadrant II.

Based on the determination that the current sample (114 ms) should have a reconstructed phase angle for the first correlation filter that is in the fourth quadrant (IV), the following equations 12 and 13 may be used to map the original phase angles to the reconstructed phase angles:

$$\Phi_1 = 2\pi - \phi_1 \quad (EQ12)$$

$$\Phi_2 = 2\pi - \phi_2 \quad (EQ13)$$

Responsive to these Equations, the Original Phase Angles of 0.997 Radians and 2.568 Radians for the sample at 114 ms (FIG. 23) may be mapped to the reconstructed phase angles of 5.286 radians and 3.715 radians respectively.

Continuing down the table in FIG. 23, the next sample (115 ms) has signs (+,−) associated with the adjusted outputs which correspond to the reconstructed phase angle for the first correlation filter remaining in quadrant IV. However, the next sample at 116 ms has an adjusted output 474 associated with the second correlation filter which now has a positive sign 476 while the adjusted output 470 associated with the first correlation filter continues to have a positive sign 472. The corresponding pair of signs for the 116 ms sample is thus positive and positive (+,+).

This change in sign from the 115 ms sample to the 116 ms sample indicates that the reconstructed phase angle for the first correlation filter (and the second) has again moved to a new quadrant. To determine which quadrant, the detector may be operative to analyze the current sample and the preceding sample responsive to portions of the information represented in FIG. 22.

For example, the program instructions associated with the detector may be operative to determine that the preceding sample (115 ms) had a reconstructed phase angle for the first correlation filter that was in the fourth quadrant (IV). The program instructions may also determine that of the adjacent quadrants (III or I) to the fourth quadrant (IV), the signs (+,+) of the current sample (116 ms) correspond to the signs (+,+) associated with phase angles and corresponding reconstructed the first quadrant of the next cycle ($I^{+1}$) and not the signs (+,−) associated with third quadrant (III).

Based on the determination that the current sample (116 ms) should have a reconstructed phase angle for the first correlation filter that is in the first quadrant of the next cycle ($I^{+1}$), the following equations 14 and 15 may be used to map the original phase angles to the reconstructed phase angles:

$$\Phi_1 = 2\pi + \phi_1 \quad (EQ14)$$

$$\Phi_2 = 2\pi - \phi_2 \quad (EQ14)$$

Responsive to these equations, the original phase angles of 0.508 radians and 1.062 radians for the sample at 116 ms (FIG. 23) may be mapped to the reconstructed phase angles of 6.792 radians and 5.221 radians respectively.

For cases where the reconstructed phase angles continue to increase through quadrants $I^{+1}$, $II^{+1}$, $III^{+1}$, $IV^{+1}$, and $I^{+2}$, the reconstructed phases may be calculated from the original phase angles responsive to the corresponding formulas 420 listed in the table.

As the preceding examples illustrate, in an embodiment of the detector, the sign pairs of the adjusted outputs for a sample and the sign pairs of the preceding sample from the correlation filters may be used by the detector to determine how to map the calculated original phase angles to reconstructed phase angles which more accurately reflect the phase delay of the ultrasonic sound signal.

The change in sign pairs reflects changes or movement of the original and/or reconstructed phase angles for consecutive samples from one quadrant to another adjacent quadrant. As used herein a quadrant corresponds to a span or range of $\pi/2$ (ninety degree) angles. In alternative embodiments of the detector, other methods for detecting for changes in the outputs reflecting phases moving from one quadrant (span of $\pi/2$ angles) to another adjacent quadrant (span of $\pi/2$ angles) may be used. For example rather than monitoring the change in sign pairs of the adjusted outputs as discussed previously, the detector may monitor the non-adjusted outputs of the correlation filters for values which pass predetermined voltage thresholds. Such thresholds may correspond to the offset values discussed previously. For example, if the offset voltages for each correlation filter correspond to 2.5 volts, the detector may be operative to monitor for changes in the outputs which move from above to below 2.5 volts or move from below to above 2.5 volts. Thus an alternative embodiment may be operative to determine how to map an original phase angle to a reconstructed phase angle responsive to which direction the threshold is being crossed, which correlation filter output is crossing the threshold, and the previous sample's associated quadrant.

As discussed previously, the reconstructed phase angles for each correlation filter are separated by $\pi/2$ rads. As a result, original phase angles and reconstructed phase angles associated with only one of the correlation filters may be needed to determine if sheet media corresponds to a single sheet or multiple sheets. Thus, in order to reduce the number of calculations performed by a processor, the detector may be operative to only determine original phase angles and corresponding reconstructed phase angles for only one of the correlation filters rather than for both correlation filters. However as discussed previously the determination of original phase angles and the mapping of the original phase angles to the reconstructed phase angles is done responsive to the outputs from both correlation filters.

Some embodiments of the detector may be operative to use fixed threshold values to distinguish reconstructed phase angles corresponding to single sheets and reconstructed phase angles corresponding to multiple sheets. For example, as shown in FIG. 7, a single sheet passing through the detector may consistently produce reconstructed phase angles which are less than 3 rads, whereas doubles, or triples or other multiples of sheets may produce reconstructed phase angles which consistently extend above 3 radians. Thus a fixed threshold corresponding to 3 rads may be used by the detector for determining when media in the detector corresponds to multiple overlapped sheets.

In other embodiments, other algorithms may be used which distinguish single sheets from multiple sheets based on the reconstructed phase angles produced. For example, in alternative embodiments, average or median reconstructed phase angles may be compared to one or more threshold values rather than the maximum angle produced by the detector to distinguish between single or multiple sheets.

In addition, alternative embodiments of the detector may be operative to determine the number of sheets when multiple sheets are detected. For example responsive to the reconstructed phase angles produced, the detector may be used to distinguish between doubles or triples or other multiples of sheets.

In some embodiments of the detector, the described reconstruction algorithm may produce reconstructed phase angles which consistently correspond to the actual phase delay of the ultrasonic sound signal when flat sheets(s) are used, be it a single or multiple (either perfect multiple or shingled multiple). However, a crumpled single may produce corresponding reconstructed phase angles which appear to the detector as indicating the presence of a double or triple. The extra ringing on the leading edge of the crumpled check waveform may be one cause for an abnormally large reconstructed phase angle.

In some embodiments of the detector, the extra ring typically appears within 8 ms after the leading edge reaches the detector or before the adjusted output for the second correlation filter ($y_2$) goes from positive to negative. The waveform ringing eventually settles down. Thus an alternative embodiment may be operative to wait a predetermined amount of time after the adjusted output for the second correlation filter ($y_2$) goes from positive to negative for the first time (the reconstructed phase angle associated with the first correlation filter should be moving from the second quadrant (II) to the third quadrant (III) at that point). After the predetermined amount of time has elapsed, the detector may continue with the determination of the reconstructed phase angles under the assumption that the first sample being reconstructed after the delay is within one quadrant from the third quadrant (III).

In an example embodiment of the detector, the predetermined amount of time may correspond to a delay of about 56 ms which may also correspond to about 26 mm of movement of the sheet at a 500 mm/sec transport speed. The reconstructed phase angles continue to be determined as described above for the samples during the predetermined amount of time (also referred to herein as a time delay). However for the first sample after the time delay, the detector may reset the associated quadrant and/or signs of the sample to an updated quadrant number and/or set of signs.

In this described embodiment, the quadrant (for the first correlation filter) that is associated with this first sample after the time delay may be determined to remain in either of the second (II), third (III) or fourth (IV) quadrants, if the corresponding reconstructed phase angle (for the first correlation filter) that is associated with this first sample after the time delay is in the second (II), third (III) or fourth (IV) quadrants after the delay. However, the detector may be operative to reset the sample to correspond to the second quadrant (II) (and/or the signs associated with the second quadrant) if the reconstructed phase angle for this first sample after the time delay corresponds to a quadrant less than the second quadrant (II). In addition the detector may be operative to reset this first sample after the time delay to correspond to the fourth quadrant (IV) (and/or the signs associated with the fourth quadrant) if the reconstructed phase angle for the sample corresponds to a quadrant greater than the fourth quadrant (IV).

After the quadrant (and/or signs for the quadrant) associated with this first sample after the time delay has or has not been reset as discussed above, the detector is operative to continue with determining reconstructed phase angles for the second sample after the delay. However, when determining with which quadrant the second sample after the delay is associated, the comparison of the signs between the first sample after the delay and the second sample after the delay is performed relative to the quadrant and/or signs to which the first sample may have been reset.

Thus if the quadrant associated with the first sample after the delay was reset from the first quadrant in the next cycle ($I^{+1}$) down to the fourth quadrant (IV), the evaluation as to what quadrant the second sample after the delay is associated with is determined relative the first sample after the delay being in the fourth quadrant (IV) with signs of (+,−) rather than being in the first quadrant in the next cycle ($I^{+1}$) with signs of (+,+). After the second sample after the delay the detector determines the reconstructed phases of subsequent samples in the manner previously described without resetting the associated quadrants of the preceding samples.

In an example embodiment the detector may include a processor operative to perform one or more of the calculations discussed previously involving equations 1-15. In an alternative embodiment, a processor such as a computer of the apparatus (e.g. an automated banking machine or other machine) which comprises the detector may perform one or more of the calculations discussed previously. Such embodiments may include software with math libraries capable of performing square root, arccos functions and other relatively complex floating point operations.

However, in an alternative embodiment, rather than performing complex math functions such as the arccos function for each sample measured by the detector, the processor which determines the original phase angle values may access a data store included in the detector or elsewhere which includes stored therein a table of pre-calculated phase angles. The processor may be operative to use the table to lookup at least one of the original phase angles for each sample using the adjusted outputs for the correlation filters as an index to the table.

In this described embodiment, the processor may be able to lookup data corresponding to original phase angles from a table substantially faster than performing the arccos function and the other complex floating point calculations discussed above with respect to equations 4 and 5.

In an example embodiment of the detector, the analog voltage outputs ($v_1$ and $v_2$) from the correlation filters may be processed by A/D converters to produce corresponding 8-bit digital outputs. For example, analog outputs ranging from 0 to 5 volts may be converted to digital outputs ranging from 0-255. For example, the processor may produce corresponding 8-bit digital adjusted output values ($y_1$ and $y_2$) according to equations 1 and 2 above to produce bipolar digital adjusted outputs ranging from −128 to +128.

The processor may operate to mathematically combine or otherwise provide a result based on the adjusted outputs from the two correlation filters to form an index usable to retrieve a corresponding original phase angle(s) from the pre-calculated table. In an example embodiment of the detector, the table may have a length of 64 k to represent all combinations of adjusted outputs ($y_1$ and $y_2$) from the correlation filters (e.g., 256 times 256). Each row may include two precalculated 16-bit values, which values correspond to the precalculated original phase angles ($\phi_1$ and $\phi_2$) for the first and second correlation filters respectively. As a result such a table may have a size of about 256 k bytes (64 k times 32 bits).

In an alternative embodiment, the table size (i.e., the number of rows) may be reduced by removing rows which have data that can be easily derived from other rows. For example, the table may be reduced to a quarter of the original size by only implementing the case when both $y_1$ and $y_2$ have positive signs. If samples corresponding $y_1$ and $y_2$ do not both have positive signs, the detector may be operative to: make them positive for purposes of making an index; look up the corresponding original phase values from the reduced table; and perform a corrective operation as required to convert the original phase values retrieved from the table to the correct original phase values which correspond to the one or both of the adjusted outputs ($y_1$ and $y_2$) being negative.

As discussed previously, an example embodiment of the detector may need to determine original phase angles for only one of the correlation filters. Thus the table may be reduced further by including precalculated original phase data associated with only one correlation filter. As a result the size of the table can be reduced again by half as each row only includes one 16-bit value rather than two 16-bit values. For example, the precalculated original phase angles stored in the table may only be generated using equation 4. However, as will be described below, embodiments may (if needed) determine original phases angles corresponding to equation 5 using a table with only equation 4 data by generating an index to the table with the adjusted y1 and y2 values reversed.

By applying both of the above described reduction techniques, the table size may be reduced from the 256 k bytes to only 32 k bytes. In an example embodiment of the detector, the table may be stored in flash RAM or other data store which is accessible to the processor associated with the detector.

In an example embodiment of the detector, the floating point outputs of equations 4 or 5 may be mapped to a fixed point integer value for storing in the table by multiplying the phase values in radians produced by equations 4 or 5 by a constant K shown in equation 16.

$$K = 9000/\pi \quad \text{(EQ16)}$$

Here K is chosen to produce integer values in multiples of 0.02 degrees. Thus an integer value of 50 in the table would correspond to a 1 degree phase angle. In the table, signed integer values ranging from −32,768 to +32,767 can represent phase angles ranging from −655.36$_N$ to +655.34$_N$. In an example embodiment of the detector, a precalculated table formed in this manner, may cover more than ±3.5 radian which may be sufficient to represent the maximum phase delay caused by a sextuple (6 overlapped sheets).

In the described embodiment in which the table has been reduced by only including rows for the case where the adjusted outputs ($y_1$, $y_2$) are positive, an index (z) for accessing an original phase angle from such a reduced table may be calculated according to equation 17.

$$z = 128 \cdot w_2 + w_1 \quad \text{(EQ17)}$$

Here $w_1$ corresponds to the absolute value of $y_1$ (i.e., $|y_1|$) and $w_2$ corresponds to the absolute value of $y_2$ (i.e., $|y_2|$). If the table stores precalculated original phase angles generated from equation 4 for example, the variable z corresponds to an index to the table which is operative to locate original phase angle for the first correlation filter.

For embodiments of the detector which also need phase information corresponding to the second correlation filter, the same table (derived using equation 4) may be used but a reverse index ($z_r$) may be calculated according to equation 18.

$$z_r = 128 \cdot w_1 + w_2 \quad \text{(EQ18)}$$

Here the indexes z and $z_r$ correspond to left shifting $w_2$ (or $w_1$) by 7 bits and then adding $w_1$ (or $w_2$). To simplify the table further, $w_1$ and $w_2$ may be confined to a range from 0 to 127. If either of them is 128, the value may be reduced to 127. Since the maximum value (i.e., 128) occurs when the detector is in the no sheet condition, the phase information lost may have little impact on the accuracy of the device to distinguish single sheets from multiple sheets.

In an embodiment of the detector, precalculated original phase angles for the described reduced table which are accessed using the above described index z (or $z_r$) may be generated according to the function shown in equation 19.

$$f(z) = f(128 \cdot w_2 + w_1) = \text{int}\left[0.5 + \frac{9000}{\pi} \cdot \arccos \frac{w_1}{\sqrt{w_1^2 + w_2^2}}\right] \quad \text{(EQ 19)}$$

A method of producing or manufacturing the exemplary detector may include a method step which involves generating the above described table. Such a method may include the method step of forming the reduced table according to equation 19 for combinations of $w_1$ and $w_2$ which range from 0 to 127. The method of producing the detector may further include storing the data for the table in a data store which is accessible by the processor of the detector. A method of operating such a detector may include accessing the table to determine original phase values for one or both correlation filters using indexes generated by the detector according to equation 17 and/or equation 18. Because this described table was reduced by including phase information for only cases where $y_1$ and $y_2$ are both positive, the method of operating the detector may further include a step involved with converting the data retrieved from the table to reflect the original signs of y1 and y2 (if one or more are negative).

For example if $y_1$ is negative, equation 20 may be used to map the value f(z) retrieved from the reduced table at index (z) to a value f(z)* which corresponds to the correct original phase angle associated with the first correlation filter.

$$f(z)^* = 9000 - f(z) \quad \text{(EQ20)}$$

If the reduced table is accessed using the index ($z_r$) from equation 18 to find phase angle data corresponding to the second correlation filter, then when $y_2$ is negative, equation 21 may be used to map the value $f(z_r)$ retrieved from the table at index ($z_r$) to a value $f(z_r)^*$ which corresponds to the correct original phase angle associated with the second correlation filter.

$$f(z_r)^* = 9000 - f(z_r) \quad \text{(EQ21)}$$

EXAMPLES

During the operation of the detector the following examples show various combinations of adjusted outputs $y_1$ and $y_2$ and the resulting original phase angles $\phi_1$ and $\phi_2$ in degrees that may be determined by the detector using the phase information f(z) and $f(z_r)$ accessed from the reduced table at the indexes z, $z_r$ calculated from $y_1$ and $y_2$.

Example 1

$y_1 = 10, y_2 = 100$ $w_1 = 10, w_2 = 100$ $z = 128*100 + 10 = 12810$ $z_r = 128*10 + 100 = 1380$ $f(z) = f(12810) = 4214$ $f(z_r) = f(1380) = 286$ $\phi_1 = f(z)/50 = 84.29_N$ $\phi_2 = f(z_r)/50 = 5.72_N$ Here the adjusted outputs ($y_1$, $y_2$) are both positive. Thus the phase angle data for f(z) and $f(z_r)$ accessed from the table does not need to be adjusted by the detector.

Example 2

$y_1 = -10, y_2 = 100$ $w_1 = 10, w_2 = 100$ $z = 128*100 + 10 = 12810$ $z_r = 128*10 + 100 = 1380$ $f(z)=f(12810)=4214$ $f(z_r)=f(1380)=286$

Here, since only $y_1$ is negative, only the table value for f(z) must be adjusted according to equation 20 as follows:

$f^*(z)=9000-f(z)=9000-4214=4786$ which results in the following original phase angles in units of degrees.

$\phi_1=f^*(z)/50=95.72°$ $\phi_2=f(z_r)50=5.72°$

Example 3

$y_1=10, y_2=-100$ $w_1=10, w_2=100$ $z=128*100+10=12810$ $z_r=128*10+100=1380$ $f(z)=f(12810)=4214$ $f(z_r)=f(1380)=286$

Here, since only $y_2$ is negative, only the table value for $f(z_r)$ must be adjusted according to equation 21 as follows:

$f^*(z_r)=9000-f(z_r)=9000-286=8714$ which results in the following original phase angles in units of degrees.

$\phi_1=f(z)/50=84.29°$ $\phi_2=f^*(z_r)/50=174.28°$

Example 4

$y_1=-10, y_2=-100$ $w_1=10, w_2=100$ $z=128*100+10=12810$ $z_r=128*10+100=1380$ $f(z)=f(12810)=4214$ $f(z_r)=f(1380)=286$

Here, both $y_1$ and $y_2$ are negative, thus the table values for both f(z) and $f(z_r)$ must be adjusted according to equations 20 and 21 as follows:

$f^*(z)=9000-f(z)=9000-4214=4786$ $f^*(z_r)=9000-f(z_r)=9000-286=8714$ which results in the following original phase angles in units of degrees.

$\phi_1=f^*(z)/50=95.72°$ $\phi_2=f^*(z_r)/50=174.28°$

In example embodiments of the detector, once at least one of the original phase angles have been determined for a sample using the above described method of looking up the original phase angle from a table, the detector is operative to map the original phase angle to a reconstructed phase angle responsive to the change in signs of the adjusted outputs ($y_1$, $y_2$).

As discussed previously, the detector may only need to determine the original phase angle and corresponding reconstructed phase angle for one correlation filter. However, in alternative embodiments, the detector may be operative to calculate the original phase angles and corresponding reconstructed phase angles for both correlation filters for verification, troubleshooting, and/or debugging purposes.

In described embodiment, the detector may include one or more processors capable of determining reconstructed phase angles according to the previously described methods. However, it is to be understood that in alternative embodiments, one or more processors associated with the automated banking machine or other machine which includes the detector may be operative to determine reconstructed phase angles according to the previously described methods.

Further although the described embodiment of the detector and/or automated banking machine may determine original phase angles responsive to a table of precalculated phase information, in alternative embodiments, the detector and/or automated banking machine may be operative to calculate the original phase angles for each sample using the equations 4, 5 and/or 19.

Figure 24:
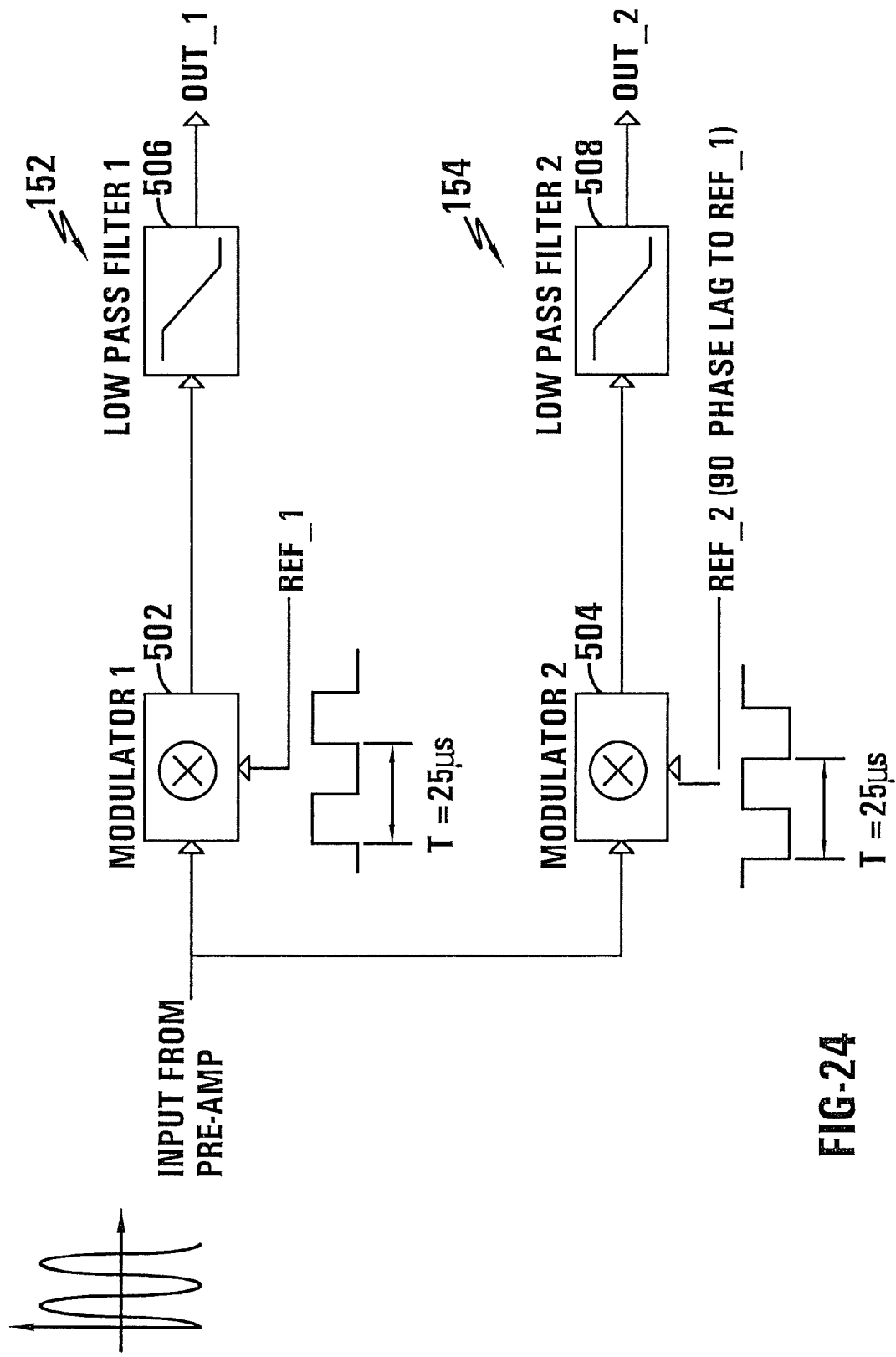
FIG. 24 shows a schematic view of orthogonal correlation filters.

An exemplary embodiment of the detector may comprise orthogonal correlation filters configured with two correlation filters 152, 154 as discussed previously with respect to FIG. 4. As shown in FIG. 24, each correlation filter may have a modulator 502, 504 and a low-pass filter 506, 508. As discussed previously, the modulating or reference signals REF_1 and REF_2 fed into the respective modulators are of the same frequency and have a 90 degree phase difference between them. In this described embodiment the modulator may comprise an analog multiplier. Similarly, the low-pass filter may also be of another format and/or with different orders (as the application of the detector may require), and in alternative embodiments may comprise a (synchronized) integrator (with or without sample-hold stage).

Figure 25:
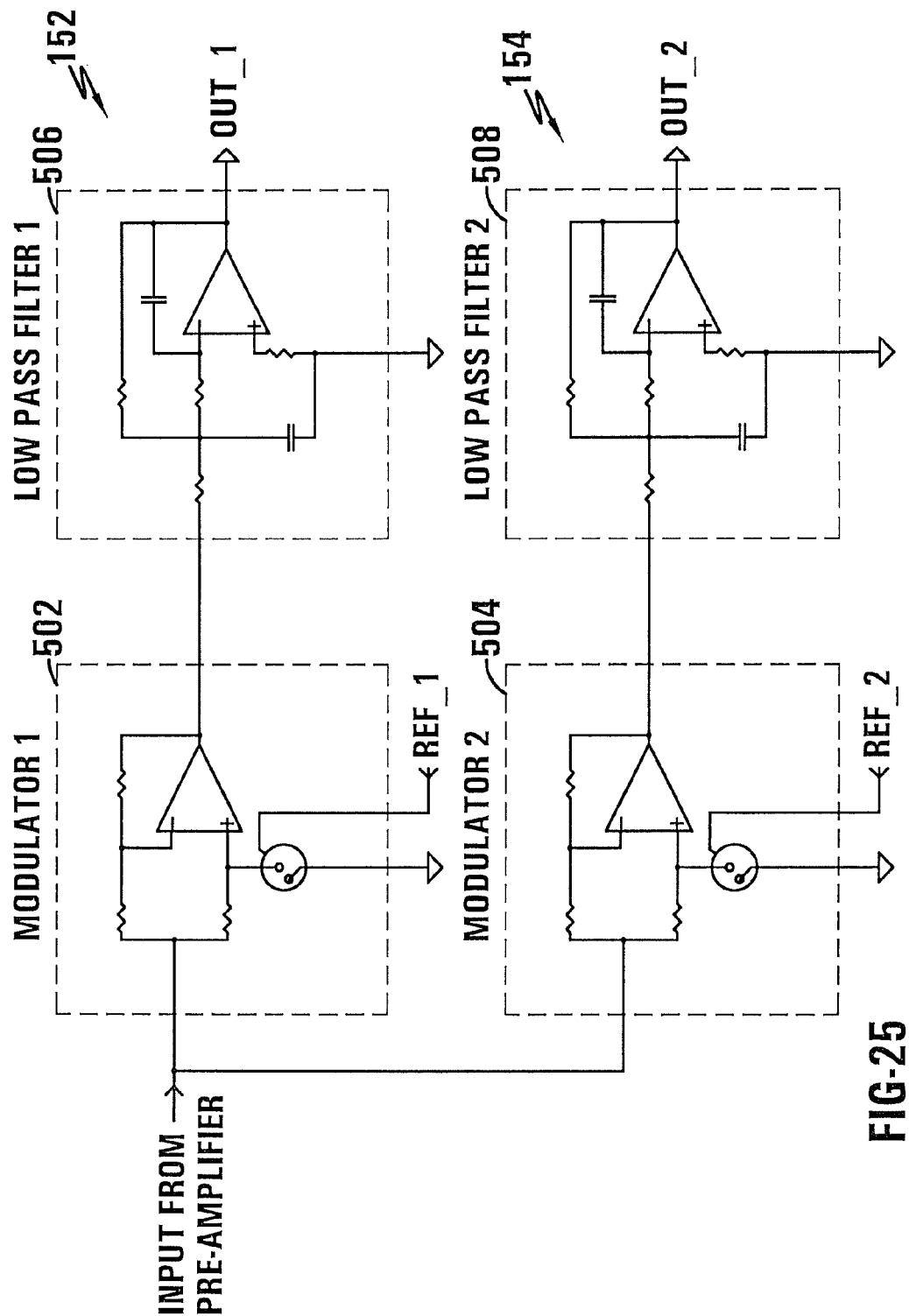
FIG. 25 shows an example of a circuit which comprises the orthogonal correlation filters.

FIG. 25 shows an example of a circuit which may be implemented for use in a relatively low cost embodiment of the orthogonal correlation filters. Here each modulator may be implemented with an analog switch controlled "chopper", having a gain of either +1 (switch closed) or −1 (switch open) depending on whether the logical level of the respective reference signal (REF_1 or REF_2) is '0' or '1'. The reference signals (or the chopping control signals) are logical instead of analog, so that the typically more expensive analog multiplier may be replaced by a relatively low-cost "chopper".

For example with respect to the modulator 502 of the first correlation filter 152, when the switch is open or the control logical level of REF_1 is '0', the modulator has gain of −1. When the switch is closed, or REF_1 is '1', the modulator has gain of 1. A similar functional description corresponds to modulator 504 of the second correlation filter 154. To maintain the "orthogonal property", REF_1 and REF_2 must be of the same frequency and π/2 radians (90 degrees) apart from each other in phase. As discussed herein, REF_2 is chosen to be lagging REF_1 by π/2 radians; however, in alternative embodiments, REF_1 may lag REF_2 by π/2 radians.

The low-pass filters 506, 508 may be implemented in this described embodiment as low-pass filters with second order MFB with negative gain. The conjugate pole pair may be so placed that it has enough attenuation (e.g., more than 60 dB) on the modulation frequency (REF_1 and REF_2) and other problem frequencies.

The described embodiments of the detector apparatus have been shown as being used in deposit accepting apparatuses of automated banking machines. However, it is to be understood that in alternative embodiments, the detector may be incorporated into other sheet handling apparatuses such as currency recycling devices, check handling devices, cash dispensers, printers, copiers, scanners, automated banking machines, or any other device that processes or transports sheets of paper or other materials. Further the types of sheet media which may be detected for multiple overlapped sheets may include at least one of checks, currency, paper sheets, paper documents, and/or other items capable of enabling an ultrasonic sound wave to pass therethrough.

Computer software instructions used in operating the detector, automated banking machines and connected computers may be loaded from computer readable media or articles of various types into the respective computer processors. Such computer software which comprise computer executable instructions may be included on and loaded from one or more articles such as diskettes CDs, DVDs or ready only memory devices. Such software may also be included on articles such as hard disk drives, tapes, flash drives, and other non-volatile memory devices. Such software may also be stored in firmware of the detector and/or the automated banking machine or other systems which include the detector. Other articles which include data representative of the computer executable instructions for operating computer processors in the manner described herein are suitable for use in achieving operation of the detector, automated banking machine, and/or other systems in accordance with embodiments described herein.

The embodiments of the detector, automated banking machines and/or other systems described herein have been described with reference to particular software components and features. Other embodiments may include other or different software components which provide similar functionality.

While the preceding example embodiment has involved using an ultrasonic detector to determine whether sheets being received or processed constitute single or multiple sheets, the principles described may be used for other purposes as well. For example some automated banking machines may include note acceptors of the type discussed in the incorporated disclosures. For purposes hereof the note acceptor will be deemed to include a device which operates to receive currency notes and to analyze them for purposes of determining whether they are a valid or an invalid note. For purposes of this disclosure, sheets received by a note acceptor that are not determined to be a valid note shall be called a suspect counterfeit or invalid note even through such sheets may include other types of sheets which have been inadvertently provided to the note acceptor. These may include for example deposit tickets or other items that were not meant to be submitted as notes. Further it should be understood that in some embodiments note acceptors may also operate to perform the function of check acceptors and vice versa. Thus in some embodiments a single device may operate to analyze and process both notes and checks. This may be done for example in the manner of the incorporated disclosures.

In some example embodiments the automated banking machine may include a note acceptor that includes one or more validators therein. The one or more validators are positioned adjacent to a sheet path in the note acceptor through which notes pass for purposes of determining whether or not they are valid notes or invalid notes. The validator includes one or more sensors and operates to sense one or more properties of a note in the sheet path usable to determine whether the sheet is a valid note or a suspect counterfeit note. Examples of some sensors that may be used in some embodiments for determining the genuineness of notes are shown in U.S. Pat. Nos. 7,366,250; 5,923,413 and/or 6,774,986, the disclosures of each of which are incorporated herein by reference in their entirety. Of course these approaches are exemplary and in other embodiments other approaches may be used.

In some situations ingenious criminals may produce counterfeit notes using discrete pieces of genuine notes. This might be done for example because genuine notes that have been torn and which are missing a portion thereof, may still be redeemed as genuine notes. Thus for example several genuine notes may have portions thereof separated therefrom and may still be accepted as suitable notes by banks and retail or commercial establishments. Some criminals may take the removed portions from several genuine notes and include them in a composite note which is also referred to herein as a mosaic note. Such a note because it has pieces of genuine notes, may not be determined by at least some validators in note acceptors, to be invalid.

Figure 26:
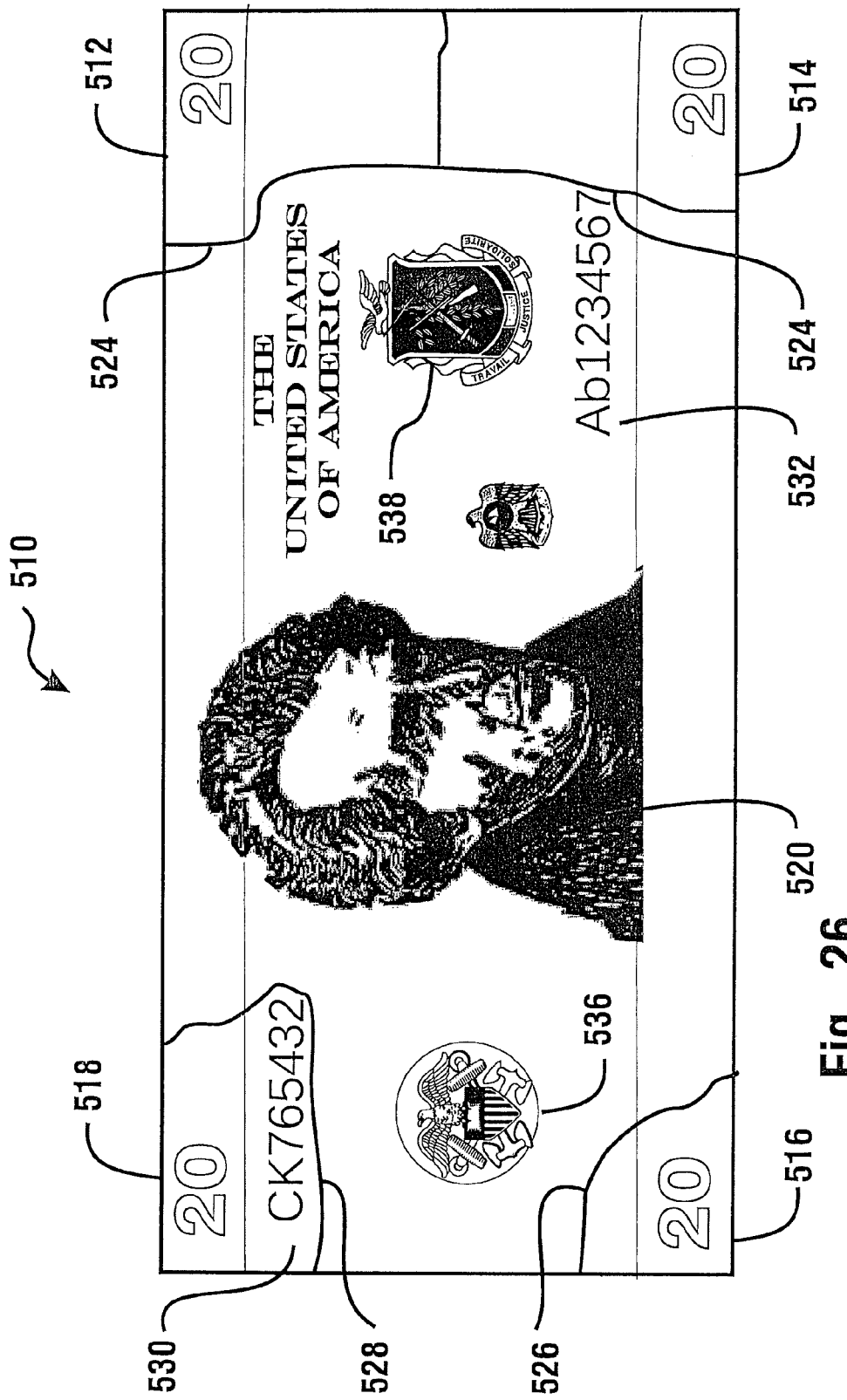
FIG. 26 is a schematic view of an example counterfeit note produced from discrete pieces of other genuine notes.

The schematic example of a composite or mosaic note 510 is shown in FIG. 26. Note 510 in this exemplary embodiment includes pieces from genuine notes. These pieces 512, 514, 516 and 518 in this embodiment correspond to corners which have been taken from genuine notes. It should be understood that while in this exemplary embodiment the pieces from genuine notes have been taken from corners, in other embodiments other pieces taken from other areas of genuine notes may be used.

In this exemplary embodiment of note 510, the note further includes a central body portion 520. Central body portion 520 in some embodiments may comprise a photo reproduction of an area of a genuine notes. In other embodiments the central body portion may comprise a body of a genuine lower denomination note. Central body portion 520 is operatively attached to the pieces of the genuine note. The central body portion is configured so that it can join with the note pieces along seams 522, 524, 526 and 528. In the exemplary embodiment the seams are comprised of joints formed using an adhesive material. The adhesive material may be a suitable glue or cement that forms a generally permanent bond between the central body portion and the genuine note pieces. In some exemplary embodiments the seams are formed in abutting relation so that the overall counterfeit note is generally of a single uniform thickness which is the same as a genuine note. However, it should be understood that in other embodiments counterfeit notes of the mosaic type may be formed by providing overlapping joints or by using tape or other overlying material. In such circumstances such overlapping joints, tape or other material used to connect the components, may provide areas of different note thickness which may be detected through operation of certain exemplary embodiments.

It should also be noted that note 510 further includes other features found in genuine notes. These include for example serial numbers 530 and 532. The exemplary note also includes seals 536 and 538 as well as other markings as would generally be found on a valid note. It should be mentioned that in the exemplary counterfeit note 510 the serial numbers on the face of the note are different. This is because in this example, the piece 518 of the genuine note that was used includes a note serial number that differs from the serial number of the reproduced note portion which is included in the body. This is shown to demonstrate a way in which invalid notes may be identified as discussed later. Further it should be understood that although in FIG. 26 only a front face of the counterfeit note is shown, the note also has a rear face which includes the properties of genuine notes associated with the genuine note pieces and the other features from the reproduction or other body portion.

Figure 27:
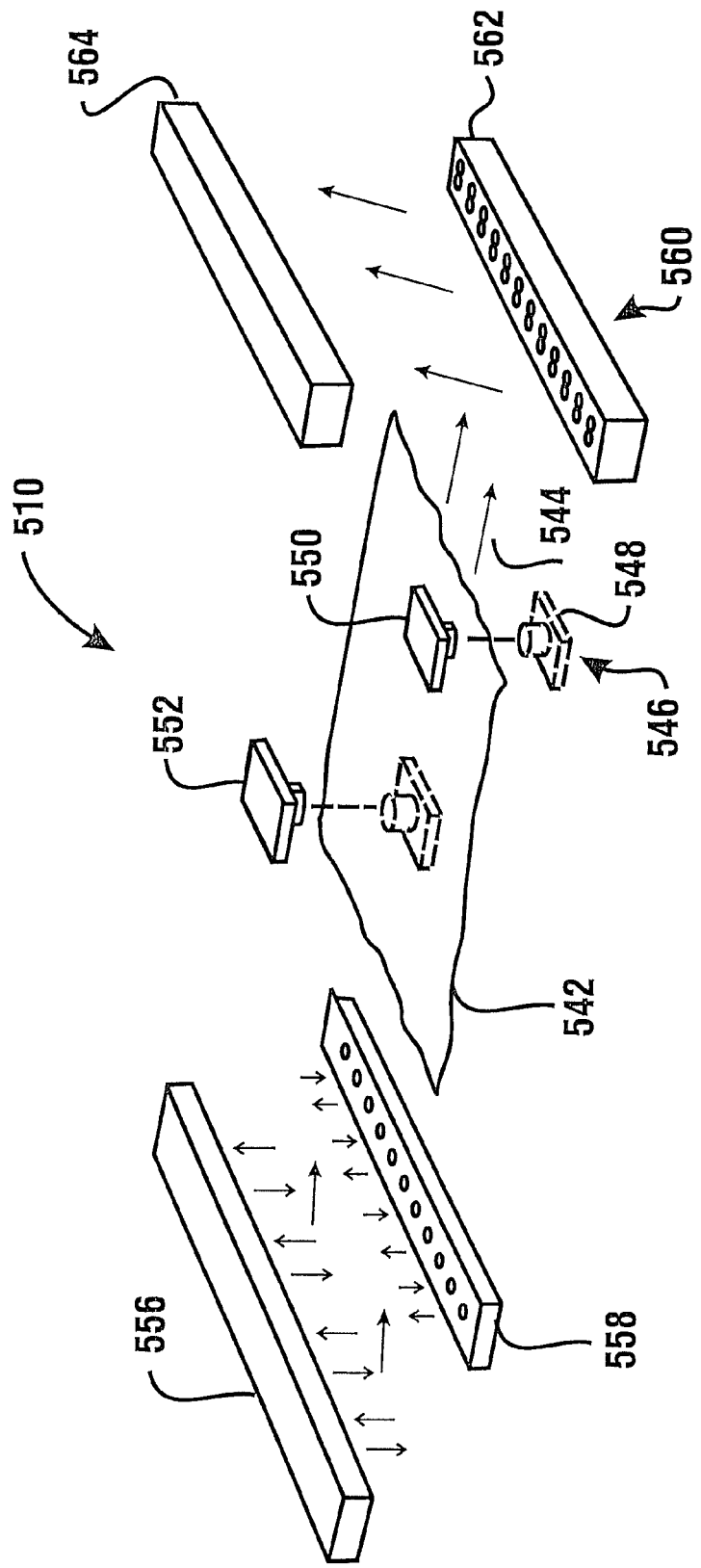
FIG. 27 is a schematic view of a sheet path in a note acceptor or similar device and example validators adjacent thereto.

FIG. 27 shows schematically an interior area of a note acceptor and a portion of the sheet path through which a sheet is moved. The exemplary note acceptor includes validators generally indicated 540. The validator includes a plurality of sensors. A sheet 542 such as a note being analyzed moves along the sheet path generally indicated by arrows 544. In this exemplary embodiment a validator includes at least one sensor which includes an ultrasonic detector 546. The ultrasonic detector includes an emitter 548 and a receiver 550. These may be of the type previously discussed. Further in some exemplary embodiments the validator may include a number of ultrasonic detectors. These are preferably disposed from one another so that various areas on the sheet may be analyzed for purposes of transmissivity of the ultrasonic signals. Such ultrasonic detectors may be disposed transversely from one another in the sheet path so that different areas on the sheet may be analyzed. Indeed in some embodiments a substantial number of ultrasonic detectors may be positioned so as to sense different areas on the sheet. For purposes of the schematic representation in FIG. 27, a second ultrasonic detector 552 is shown. However, it should be understood that this is only a representation and in other embodiments one or numerous ultrasonic detectors may be disposed along or across the sheet path. Further in some exemplary embodiments the ultrasonic detectors may be disposed both transversely and along the sheet path from one another so as to avoid interference with the separate detection of the properties of disposed areas on the sheet. Further in other embodiments different frequencies, duty cycles or other approaches may be used to achieve sensing of selected areas on the sheet for ultrasonic transmissivity.

In the exemplary embodiment shown, a further validator includes image sensors 556 and 558. Image sensors 556 and 558 are operative to emit radiation and receive image data corresponding to an image of the sheet. For example in some exemplary embodiments the image sensors may be charge couple device (CCD) arrays, complimentary metal oxide semiconductor (CMOS) image sensors, or other suitable sensors for producing data that corresponds to an image of all or a portion of the sheet. The image data may capture and analyze through operation of at least one computer for purposes of determining features on the sheet in a manner of the incorporated disclosures. Further it should be understood that the image sensors may operate to capture radiation at various frequencies reflected from the sheet so as to provide an indication of coloration or other features that are included on the sheet. Further the image sensors may be in operative connection with one or more computers so as to provide an analysis of the image data captured through the sensors. This may be done in the manner of the incorporated disclosures or for example in the manner described in U.S. Pat. No. 7,533,805 which is incorporated herein by reference in its entirety. Of course it should be understood that these approaches are exemplary and in other embodiments other approaches may be used.

Further in the exemplary embodiment the at least one validator includes a radiation transmission sensor 560. Radiation transmission sensor includes at least one radiation emitter 562 and at least one radiation receiver 564. Radiation transmission sensor 560 is operative to cause radiation to be transmitted through passing sheets. Radiation which reaches the receiver from the emitter provides transmission data which is indicative of the thickness and/or density of each sheet. In some embodiments the radiation receiver may comprise one or more photo sensors. Such sensors may include one or two dimensional sensor arrays, CCD arrays, CMOS sensors or other types of sensors such as those described in the incorporated disclosures. Further it should be understood that although one radiation transmission sensor is shown, in other embodiments multiple sensors operating to transmit light in the visible or nonvisible range may be positioned adjacent to the sheet path.

It should be understood that the validator types shown are exemplary and in other embodiments of note acceptors, or in devices for validating other types of sheets, other or additional types of validators may be used.

In operation of the exemplary embodiment of the note acceptor, notes move along the sheet path in a note direction. This is represented in FIG. 27 by a note 542 moving adjacent to the validators along the sheet path 544. The one or more ultrasonic detectors 546, 552 operate to transmit sound waves in the ultrasonic range through the sheet. The ultrasonic energy is substantially attenuated and is subject to a phase shift as the energy passing through the sheet strikes one of the seams on the sheet. This is because of the different properties of the adhesive in the area of the seam. As a result the ultrasonic detectors are operative to sense the change in density that occurs in the area of the seam. Alternatively or in addition similar effects occur with regard to sheets in which pieces of genuine notes overlap and/or are attached using tape or a similar media which changes the thickness and/or density of the sheet in the area of the seam. In some embodiments the signal received from each ultrasonic detector is passed through at least two orthogonal correlation filters of the type previously discussed. Such signal conditioning can be used to detect areas on the note of differing density and/or thickness. At least one computer that is in operative connection with the ultrasonic detectors may operate in accordance with its programmed instructions to identify a note that has an area of different density and/or thickness where such a feature would normally not be present. This area of differing properties in an inappropriate area of the sheet may be determined to correspond to a seam. As a result the at least one computer may be operative in accordance with its associated executable instructions to determine from the signals whether the note is a suspect counterfeit note on this basis. The at least one computer of example embodiments operates to produce at least one signal in response to determining that a note is valid and/or a suspect counterfeit. The machine may then take appropriate actions responsive to the at least one signal.

In alternative embodiments at least one computer in operative connection with the one or more ultrasonic detectors is in operative connection with a data store. The data store includes data corresponding to at least one signal or signal pattern from the ultrasonic detectors that corresponds to a suspect counterfeit note. Such data may be developed using known counterfeit notes to develop one or more signal "profiles" which corresponds to such counterfeits. This counterfeit note data is usable by the at least one computer to determine that the at least one signal received from the one or more ultrasonic detectors corresponds to the counterfeit note data and thus a counterfeit note.

In still other embodiments in which a plurality of ultrasonic detectors operate to sense transversely disposed areas of each sheet, the at least one computer may be operative to determine a plurality of areas on the sheet that have a differing density and/or thickness from the majority of the sheet. The at least one computer may operate in accordance with its programming to correlate these areas and determine if they appear contiguous and thus more clearly correspond to one or more seams. The at least one computer may operate in accordance with its programming to determine that the seams suggest that the note corresponds to a counterfeit note. This may be done for example, by identifying probable seams in certain areas of the sheet, seams of particular lengths, seams that extend to one or more edge surfaces of the sheet, or other identifiable features that suggest the presence of a seam or other feature associated with a counterfeit note. In addition or in the alternative, counterfeit note data stored in at least one data store may include data corresponding to particular configurations for counterfeit notes. This may include seam topographies, tape locations, density inconsistencies or other data usable to identify a counterfeit. The at least one computer can then determine if the sensed data from the ultrasonic detectors corresponds to such a counterfeit note. Of course these approaches may be applied to types of sheets other than notes and are exemplary.

Further in the embodiment shown the at least one validator includes the image sensors 556 and 558. The image sensors are operative in connection with the at least one computer to produce image data that corresponds to a visual image of all or one or more portions of each side of the note. In an exemplary embodiment the at least one computer may operate in accordance with its programming to identify the presence of a probable seam in the image data. This can be done through the execution of program instructions by the computer in the manner like that of the incorporated disclosure to find features in image data having the defined properties. This may include contiguous areas that exhibit a particular image characteristic or color which indicates the presence of a seam. The at least one computer may operate to identify the presence of and the locations of the one or more seams in the image data. The at least one computer may operate in response to the computer determining the presence of the one or more seams in the image data to indicate that the note for which the image data is analyzed, is a counterfeit note.

Alternatively or in addition, the at least one computer may operate to compare and correlate the result data corresponding to the probable seam location or locations determined from the image data with the data corresponding to the position of probable seams determined from the ultrasonic signals. This may be done for example by the at least one computer operating in accordance with its programming to compare data corresponding to the boundaries of the sheet as detected by the image data and the ultrasonic data, and determining if the probable seam locations determined through analysis of one form of data correlate to the probable seam locations as determined from the other data. If the probable seam locations determined from the image data indicating a visual seam correspond to the seam locations as determined from the ultrasonic detector data indicating a change in thickness and/or density in the same locations, this further increases the probability that the note being analyzed corresponds to a counterfeit note.

In addition in some exemplary embodiments the at least one computer may operate to analyze the image data to determine the characters that are present within the image data. This may include numerous characters and symbols included on the sheet. In some exemplary embodiments this can also include determining the characters in each of multiple serial numbers printed on the note such as serial numbers 528 and 532 shown on the note in FIG. 26. The determination of the serial numbers can be done using electronic templates to locate the features and character recognition software in a manner similar to that described in the incorporated disclosures. The at least one computer may then operate in accordance with its programming to determine whether the characters in each of the serial numbers correspond. If the numbers do not correspond such as is shown in note 510, then this is a further indication that the note is a counterfeit and for providing at least one signal indicative thereof. The computer may then operate in accordance with its programming to use this determination as a basis for treating the note as counterfeit. Alternatively or in addition, the at least one computer may operate in accordance with its programming to determine that serial numbers or other features that would be present in a genuine note are not present in the note being analyzed. The absence of one or more such features may further result in at least one computer making a determination that the note is counterfeit.

Further, in the exemplary embodiment the at least one validator includes one or more radiation transmission sensors 560. The radiation transmission sensors are operative to transmit radiation at one or more frequencies through the note. This can include in some embodiments radiation of different colors in the visible range and/or infrared or ultraviolet frequencies. The intensity of radiation received through the note by the one or more receivers 564 is used to produce through operation of the at least one computer, radiation transmission data. In the exemplary embodiment the radiation transmission data is operative to provide further indication of the variation in radiation transmissivity through the note across width and/or length of the note. Thus in the areas where the note has a seam and/or differing thickness due to overlapping joints, tape or other similar features, the radiation transmission data varies from that of a normal note.

In the exemplary embodiment the at least one computer may be operative responsive to the radiation transmission data and the data corresponding to the ultrasonic signals to determine if the areas where the ultrasonic signals suggest the presence of a seam correspond to variations in transmissivity that also suggest the presence of a seam, tape or other fastening materials in those areas. This can be done through operation of the computer producing data points corresponding to the transmissivity data across the entire note, or in those areas where a suspect seam is determined based on the ultrasonic data. The at least one computer may be operative to determine that the radiation transmission data also suggests the presence of a seam, etc. in the area where a suspect seam appears to be present based on the ultrasonic signals. The at least one computer may operate in accordance with its programming to identify the note as a counterfeit based on the ultrasonic data and the transmissivity data where the presence of one or more probable seams or other fastening feature is detected.

Further in other example embodiments the at least one computer may operate to also analyze the image data and the presence of probable seams resolved therefrom for correlation with the transmissivity data and/or the ultrasonic data. The at least one computer may operate in accordance with its programming to identify a probable counterfeit note based on determining the presence of seams or other fastening feature based on analysis of one, two or all of the ultrasonic signals, the transmissivity data and the image data. Alternatively or in addition the at least one computer may operate in accordance with its programming to weigh the different determinations resolved from each of the types of sensors. For example it may be determined that for certain types of notes, the ultrasonic data more reliably identifies the presence of seams and other fastening features than the image data or the transmissivity data. This may occur for example in circumstances where the background and coloration of the note in the area of a seam is dark and the seam is dark, so the image data and transmissivity data cannot as readily identify the seam. Likewise for other types of notes or mosaic notes where certain types of joining technology is used to hold the pieces together, the image data and/or the transmissivity data may more readily identify the presence of seams and thus a counterfeit note. This may be for example a situation where the notes generally have a background pattern in a lighter color and the area of the seam produces a visual discontinuity that is identifiable by at least one computer from the image data. Alternatively or in addition in such circumstances the seams may be visibly darker (or lighter) in the surrounding area thus making the seam more readily identifiable using the transmissivity data. The particular approach taken will depend on the type of note involved and the counterfeit conditions which the at least one computer is programmed to detect.

Also as previously mentioned in connection with some embodiments, mosaic type counterfeit notes may be made in a manner that is relatively consistent from note to note. In such cases it is possible to identify the probable seam locations and/or other fastening features, and store data corresponding thereto in the at least one data store. This may include counterfeit note data corresponding to the ultrasonic signals that would be expected from such a note. Alternatively or in addition such counterfeit note data may also correspond to the seams or other features likely to be detected in the image data and/or the differences in the radiation transmission data in the area of such seams or other features. The at least one computer may operate to compare the data sensed from a given note to the stored data and to resolve that the particular note is a valid or invalid note based thereon.

It should be understood that the example analysis described is used in connection with identifying mosaic notes and determining that they are counterfeit. Of course the at least one computer in operative connection with the at least one validator may also operate to conduct other functions and features such as those described in the incorporated disclosures to determine the denomination and validity of each sensed note. Further as can be appreciated the at least one computer causes the note acceptor to operate in response to the determination of whether a note is a valid note or a suspect counterfeit note. In the exemplary embodiment the at least one computer operates to cause valid notes to be stored in a suitable location and further operates to cause the user's account corresponding to the card data to be credited with an amount corresponding to the value of each valid note accepted. In the event the at least one computer determines that a note is a suspect counterfeit note, the exemplary embodiment operates to store the counterfeit note in a different location. The at least one computer also operates to store data corresponding to the transaction so that the source of the counterfeit note and the transaction in which it was presented can be later identified. Further the at least one computer in the machine may in some cases operate in accordance with its programming to output signals and communicate with one or more other computers to indicate that the machine has received a counterfeit note. Further in some embodiments the at least one computer may operate in accordance with its programming to forward the data regarding the note, the card data or other data to one or more remote computers to facilitate identifying the source of the counterfeit note. Of course these approaches are exemplary and in other embodiments other approaches may be used.

Figure 28:
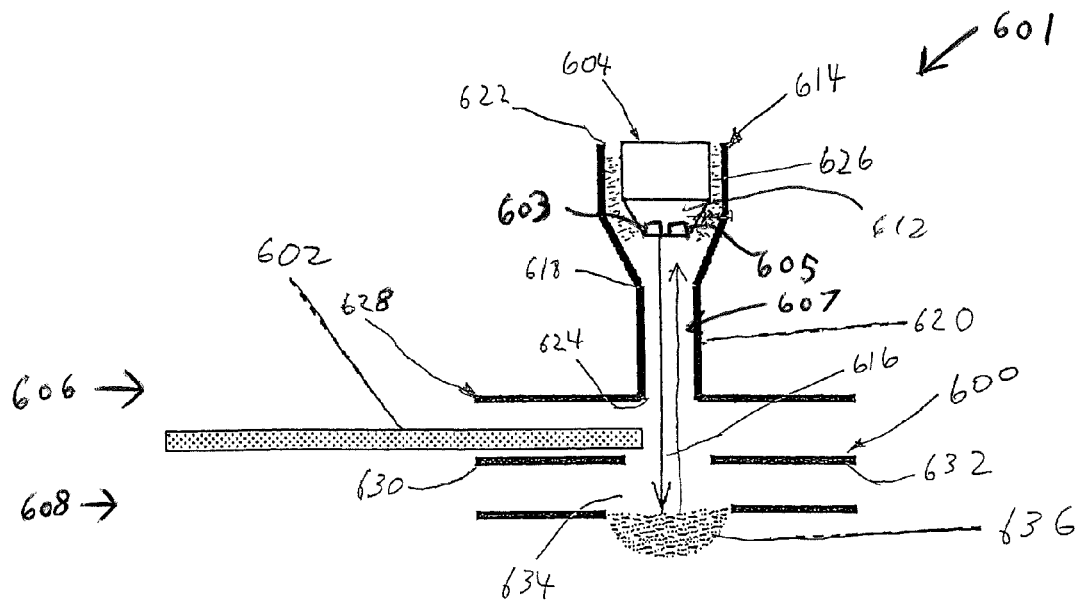
FIG. 28 is a schematic sectional view of a sheet path and related components with an ultrasonic detector positioned in a waveguide according to an exemplary embodiment.
Figure 29:
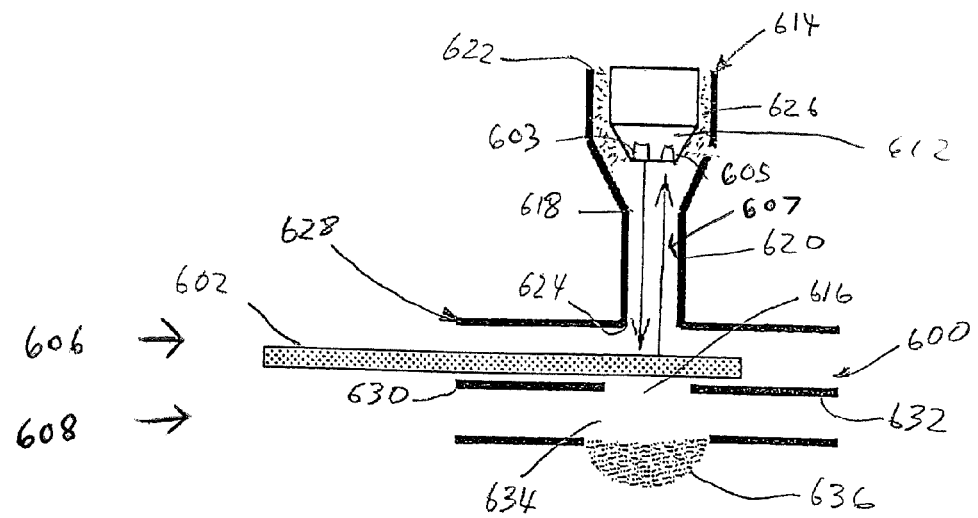
FIG. 29 is view similar to FIG. 28 but with a sheet positioned in the range of the ultrasonic detector.

FIGS. 28 and 29 show another exemplary embodiment of an apparatus 601 that is operative to detect a sheet 602 and/or properties of the sheet in a sheet path 600 of an automated banking machine through which the sheet 602 is moved. The sheet path 600 includes a first side 606 and a second side 608 opposed the first side 606. Sheets capable of being detected/analyzed via the apparatus 601 may include checks or other documents such as currency, bills or notes, vouchers, coupons, tickets or other items of value. In this example, the apparatus may include at least one ultrasonic detector 604.

As shown in FIGS. 28 and 29, the ultrasonic detector 604 may be configured to detect ultrasonic radiation (e.g., sound signals) that is reflected from a sheet or other surface. However as discussed below in more detail, the ultrasonic detector 604 may be configured to detect ultrasonic sound signals that are transmitted through the sheet or sheet path. FIGS. 28 and 29 illustrate an ultrasonic detector 604 that includes at least one ultrasonic transmitter 603 (that emits ultrasonic sound signals) and at least one ultrasonic receiver 605 (that detects the ultrasonic sound signals) adjacent to each other (e.g., integrated into a common housing, and/or in side by side relation. However, as discussed below in more detail, example embodiments of the described apparatuses may include one or more ultrasonic transmitters 603 and one or more ultrasonic receivers 605 that are spaced apart.

Figure 32:
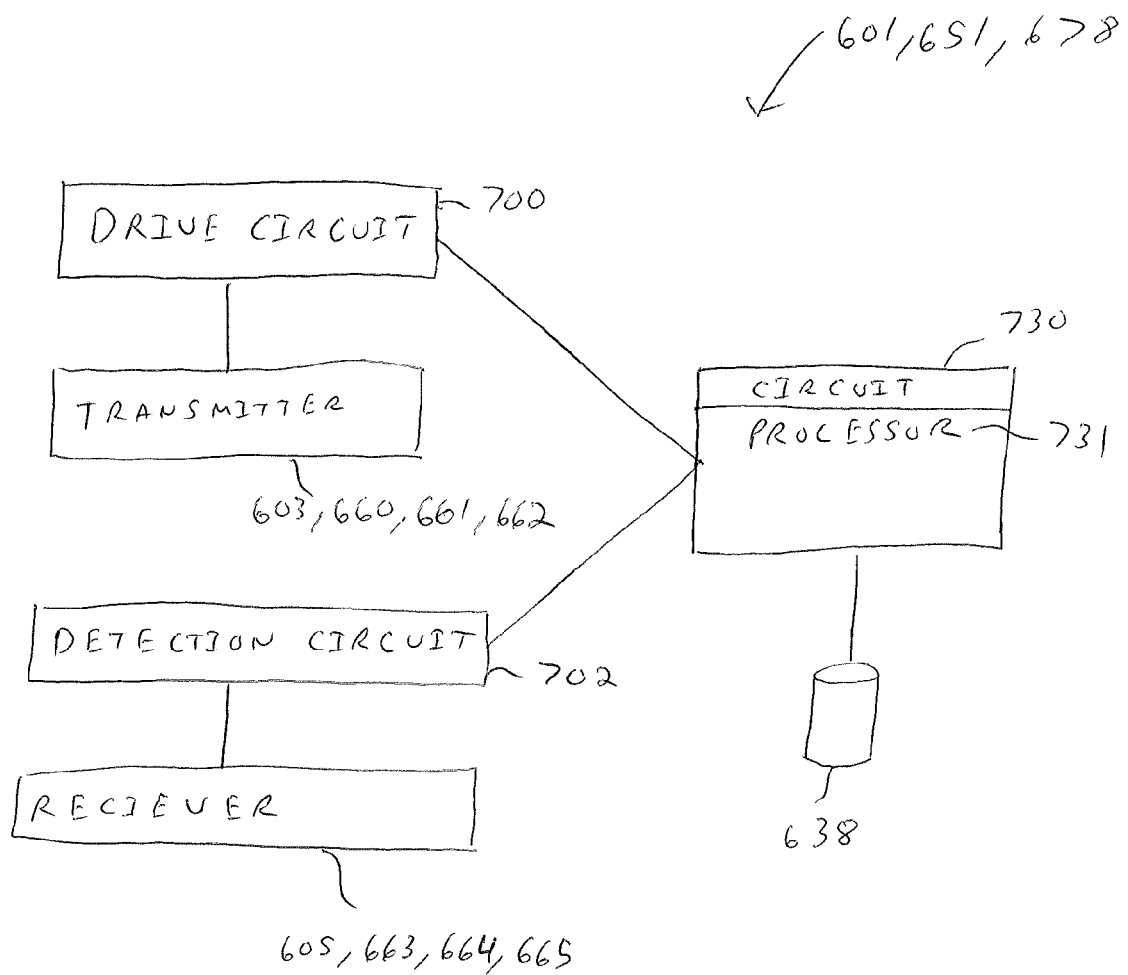
FIG. 32 is a schematic view of the ultrasonic detector in FIGS. 28-31 operatively connected to various components.

As illustrated in FIG. 32, the apparatus 601 may include and/or be in operative connection with at least one circuit 730 including at least one processor 731. The circuit may be operative to cause the transmitter 603 to operate and may be operative to evaluate output signals from the receiver 605. The at least one circuit 730 may include a processor 731 and other associated circuitry connected to the receiver 603 and transmitter 605. However, it should also be appreciated that the at least one circuit may corresponds several circuits with one or more processors that are separate and/or remote from each other. For example a processor included by the at least one circuit 730 may include a processor of the computer of the automated banking machine or other computer (e.g. a remote computer and/or a remote virtual machine operating in a remote server). Such a remote computer, server and/or a virtual machine may be operative to causes operation of the automated banking machine and devices in the automated banking machine such as the apparatus 601, a card reader, a cash dispenser, input devices, output devices, and other hardware devices associated with the automated banking machine. Examples of such servers and virtual machines usable with the example embodiments described herein are shown in U.S. Application No. 13/066,277 filed Apr. 11, 2011 which is hereby incorporated herein by reference in its entirety.

In example embodiments, the apparatus 601 includes a waveguide 614 that is operatively connected to the ultrasonic detector 604. The waveguide 614 is operative to guide or direct the ultrasonic sound signals from the ultrasonic detector 604 to a first area 616 in the sheet path 600 and back to the detector. The example waveguide 614 may be in the form of a duct or tube having walls 618 that surround a passageway 607. The cross section of the waveguide 614 may have a shape that is circular, elliptical, triangular, rectangle, and/or any other cross-sectional shape that is operative to guide transmitted and/or reflected ultrasonic sound signals. The walls 618 may be comprised of metal, plastic, rubber or other suitable material that operates to direct the ultrasonic sound signals along the passageway 607 inside the waveguide 614 to minimize energy loss of the ultrasonic sound signal and/or to prevent and/or minimize interference from ultrasonic sounds signals associated with other ultrasonic detectors. The waveguide 614 may be formed in one piece or alternatively multiple pieces using suitable fabrication processes such as welding, molding and/or casting.

The exemplary waveguide 614 has a body 620 that extends between first and second ends 622, 624. The ultrasonic detector 604 may be positioned adjacent (which may include being mounted completely or at least partially inside) the first end 622. Thus, the first end 622 may have a relatively larger cross sectional area than that of the body 620 and or opposed end 624, in order to accommodate the ultrasonic detector 604. Also, the wall 618 of the waveguide 614 in cross section may be angled radially inwardly in the shape of a funnel adjacent a front portion 612 of the ultrasonic detector 604.

By using a waveguide, example embodiments of the sheet detector may use one or more transmitters 603 that are operative to output ultrasonic sound signals with a beam angle between 45 degrees and 90 degrees (e.g., about 60 degrees). However it should be appreciated that alternative embodiments may include transmitters operative to emit ultrasonic sound signals with narrower or wider beam angles.

Dampening material 626 may be provided in this embodiment between the wall 618 of the waveguide 614 and the ultrasonic detector 604, to hold the detector in position and/or to reduce noise coming into/out of the waveguide 614. The dampening material 626 may be comprised of rubber, foam and/or any other suitable sound dampening material that is operative to at least partially absorb and/or block transmission and/or reflection of sound signals. The second end 624 is open so as to direct the ultrasonic sound signals to and/or receive an ultrasonic sound signal from the sheet path 600.

The waveguide 614 may be positioned operatively adjacent to a transport 628 that is operative to transport the sheet 602 along the sheet path 600. The transport 628 may include belts, rollers or other suitable moving members for engaging and transporting the one or more sheets. As shown in FIGS. 28 and 29, the transport 628 may include spaced first and second plate portions 630, 632 that are separated in cross section by a gap 634. The gap 634 is located in aligned relation with the second end 624 of the waveguide 614. In an example embodiment, the first and second plate portions may correspond to separate plates that are spaced apart at the gap 634. However, in other embodiments, the first and second plate portions may be included in a common plate and the gap may correspond to an aperture through the plate. Also, in this example, dampening material 636 may be provided in alignment with the gap 634 at the second side 608 of the sheet path 600.

FIG. 28 shows the sheet 602 in the sheet path 600 that is not yet positioned in the first area 616 on the sheet path 600 and thus, not located in range where it can be sensed by the ultrasonic detector 604. In other words, the ultrasonic sound signals of ultrasonic detector 604 are not blocked or attenuated by the sheet 602. In this position, the transmitter 603 of the ultrasonic detector 604 is operative to emit an ultrasonic sound signal (as indicated by the arrows in FIG. 28) that is guided by the waveguide 614 to travel towards the dampening material 636 at the second side 608 of the sheet path 600. At least a portion of the ultrasonic sound signal may be reflected back from the dampening material 636, and may travel back through the waveguide 614 to be received and sensed by the receiver 605 of the ultrasonic detector 604. In this described embodiment, the reflected ultrasonic sound signal may be in the form of a relatively weak late echo. In response to this reflected ultrasonic sound signal, the receiver 605 of the ultrasonic detector 604 outputs corresponding output signals. The circuit 730 including the processor 731 may operate in accordance with its programming based at least in part on the properties of the output signals to determine the absence of a sheet in the first area 616 on the sheet path 600.

FIG. 29 shows the sheet 602 having moved so it is positioned at the first area 616 on the sheet path 600 and thus, located in the range of the ultrasonic detector 604. In this position, the transmitter 603 of the ultrasonic detector 604 is operative to emit ultrasonic sound signals (as indicated by the arrows) that are guided by the waveguide to encounter the sheet 602 in the first area 616. The ultrasonic sound signals are at least partially reflected back from the sheet 602 and the reflected ultrasonic sound signals guided by the waveguide to be received by the receiver 605 of the ultrasonic detector 604. The reflected ultrasonic signals relative to when no sheet is detected is the form of a relatively strong early echo. In response to the reflected ultrasonic sound signals, the receiver 605 of the ultrasonic detector 604 communicates corresponding output signals to the circuit 730.

The output signals of the ultrasonic detector 604 correspond to the manner in which the ultrasonic sound signals interact with the sheet 602 positioned at the first area 616. Data may be determined by the circuit 730 based on the change in acoustic impedance through the sheet path 600 as previously mentioned. As illustrated in FIG. 32, at least one data store 638 may be in operative connection with the circuit 730. The data store 638 may include sheet data corresponding to a predetermined range of output signals corresponding to one or more types of sheets capable of being positioned at the first area 616 on the sheet path 600.

The circuit 730 may be operative to determine the presence of the sheet 602 positioned at the first area 616 on the sheet path 600 in response (at least in part) to the output signal of the ultrasonic detector 604 having a predetermined relationship with the predetermined range (e.g. detected ultrasonic energy levels within or above the predetermined range). Of course, this approach is exemplary and in other embodiments (in addition to the detection of the presence of the sheet) properties of the sheet may be determined based at least in part on the output signals of the ultrasonic detection device.

For example, (as discussed in previous embodiments) the circuit 730 may also be operative to determine that the sheet 602 is either valid or suspect (counterfeit) based at least in part on the outputs from the ultrasonic detector 604. For example, the circuit 730 may be operative to determine whether the sheet is torn/cut, includes seems, and/or has been glued or taped. Further orthogonal correlation filters may be used (as discussed previously) to determine if the sheet correspond to two or more overlapped sheets responsive at least in part to the outputs of the ultrasonic detector 604. In addition, the ultrasonic detector may produce different outputs responsive to different types of sheets (with different thicknesses and types of material). Thus the circuit 730 may be operative to determine whether the sheet corresponds to either a check or a currency note responsive at least in part to the outputs of the ultrasonic detector 604.

The detection of the presence or absence of a sheet may be determined by the circuit 730 for use with evaluating whether there is a problem with the transport (e.g. a jam or other malfunction). In response to the determination that a sheet is absent in an area and time period when the sheet should have been detected (e.g. on a path to be dispenses and/or stored), the at least one circuit may be operative to report an error to a remote server that is indicative of a problem with the automated banking machine.

Also, in cases where the circuit 730 determines that a check is suspect, the circuit may be operative to cause the transport to operate to move the sheet to a storage area reserved for suspect sheets. In addition, in cases where overlapped sheets are detected, the circuit may be operative to cause the sheet transport to operate to attempt to separate the overlapped sheets. In addition, depending on the type of sheet detected (currency or check) the circuit 730 may be operative to cause the sheet transport to move the bill to an appropriate storage area for the detected type of sheet. Thus, depending on the properties of sheets detected (and/or the absence of an expected sheet), the circuit 730 may cause appropriate actions to be taken with respect to the handling of the sheet and/or communicating information about the detected condition to a remote server.

Figure 30:
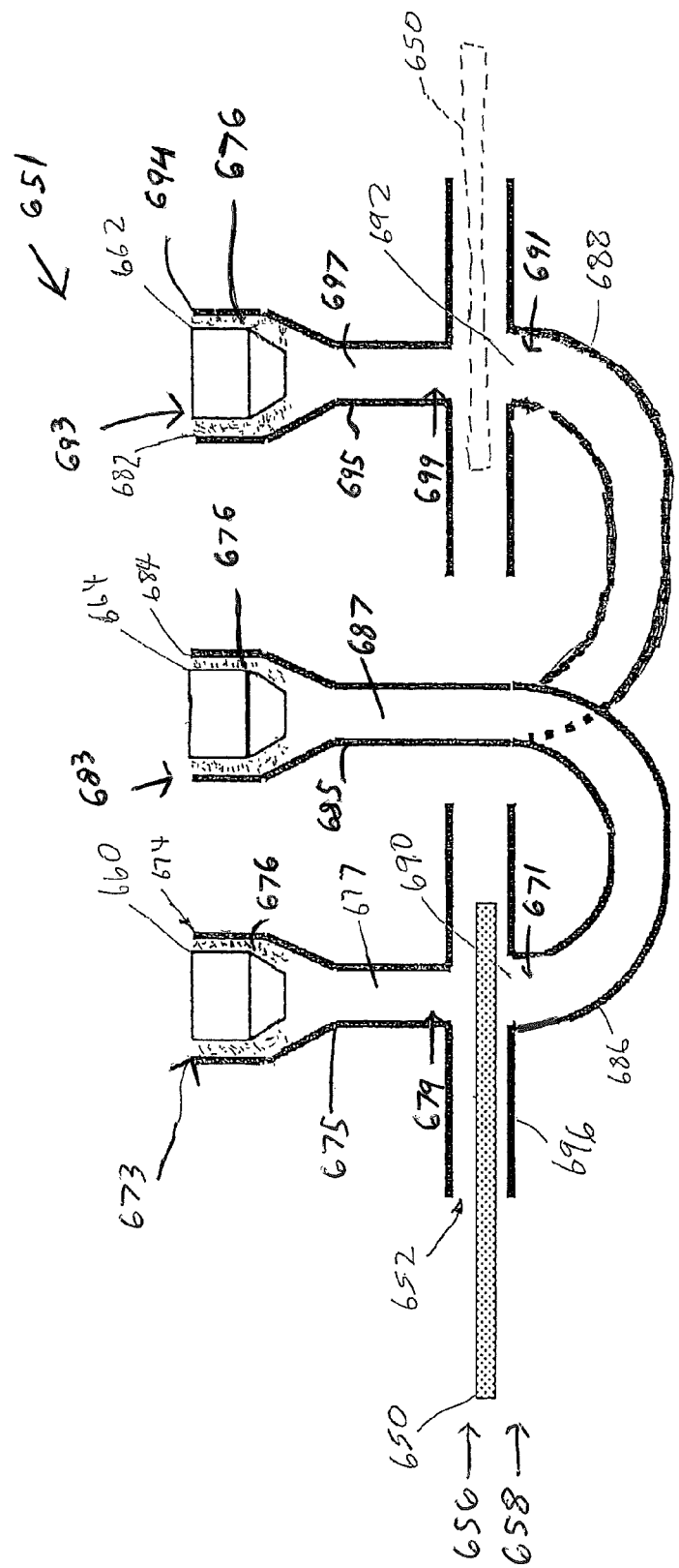
FIG. 30 is a schematic sectional view of a sheet path and related components with an ultrasonic detector positioned in a waveguide according to another exemplary embodiment.

FIG. 30 shows another example embodiment of a detection apparatus 651 for detecting at least one sheet 650 in a sheet path 652 of the automated banking machine through which the sheet 650 is moved. In this example, the sheet path 652 may include a first side 656 and a second side 658 opposed of the first side 656. The at least one sheet 650 may include checks or other documents such as currency, bills or notes, vouchers, coupons, tickets or other items of value.

The exemplary apparatus 651 may have a through-beam configuration (in contrast to the reflected-beam configuration shown in FIGS. 28 and 29). This described embodiment may include first and second ultrasonic sound transmitters 660, 662 (also referred to herein as emitters) and an ultrasonic sound receiver 664 (also referred to herein as a sensor) 664. The transmitters 660, 662 and receiver 664 may be operatively connected to at least one circuit 730 as discussed previously.

In this example, the transmitters 660, 662 and receiver 664 are located on the first side 656 of the sheet path 652. This described example of the apparatus 651 may include a plurality of waveguides 674, 684, 694 that direct ultrasonic sound signals from the transmitters 660, 662 to the receiver 664. The cross sections of the waveguides 674, 684, 694 may have circular, elliptical, triangular, and rectangle shapes and/or any other type of shape that is operative to guide ultrasonic signals. The waveguides 674, 684, 694 may includes walls 675, 685, 695 made of metal, plastic, rubber or any other suitable material that is operative to direct the ultrasonic sound signals through passages 677, 687, 697 in the waveguides, to minimize energy loss of the ultrasonic sound signals and/or to prevent and/or minimize interference from ultrasonic sounds signals associated with other ultrasonic detectors and/or waveguides.

The waveguides 674, 684, 694 include respective first ends 673, 683, 693. In this example, the first transmitter 660 is mounted in and/or adjacent to the first end 673 of the waveguide 674 and the second transmitter 662 is mounted in and/or adjacent to the first end 693 of the waveguide 694. Also in this example, the receiver 664 is mounted in and/or adjacent to the first end 683 of the waveguide 684. Each of the first ends may have a larger cross sectional area (adjacent portions that are angled radially inwardly relative lower portions of the waveguides) to accommodate receiving the transmitters and receiver therein.

In this described example, the waveguide 684 further includes a first u-shaped branch 686 and a second u-shaped branch 688 including separated passages therein. The first branch 686 extends to a second end 671 of the waveguide 684 located at the second side 658 of the sheet path 652 adjacent to a first area 690 of the sheet path 652. The first area 690 of the sheet path is also adjacent a second end 679 of the waveguide 674 located on the first side 656 of the sheet path 652. In this example, the second end 671 of the waveguide 684 (i.e., the end of the first branch 686) is coaxially aligned with the second end 679 of the waveguide 674 that includes the first transmitter 660, such that ultrasonic sound signals are directed from the waveguide 674 through the first area 690 of the sheet path 652 and into the first branch 686 of the waveguide 684 that includes the receiver 664.

In this example, the second branch 688 extends to a third end 691 of the waveguide 684 located at the second side 658 of the sheet path 652 adjacent a second area 692 of the sheet path 652 (that is spaced apart from the first area 690). The second area 692 of the sheet path is also adjacent a second end 699 of the waveguide 694 located on the first side 656 of the sheet path 652. In this example, the third end 691 of the waveguide 684 (i.e., the end of the second branch 68) is coaxially aligned with the second end 699 of the waveguide 694 that includes the second transmitter 662, such that ultrasonic sound signals are directed from the waveguide 694 through the second area 692 of the sheet path 652 and into the second branch 688 of the waveguide 684 that includes the receiver 664.

For each of the transmitters and receivers, dampening material 676 may be provided between the transmitter or receiver and the walls of the waveguides to hold the transmitters/receivers in position and/or to reduce noises coming into and/or out of the waveguides. The dampening material 676 for example may be rubber, foam or any other suitable material that is operative to block/absorb sound signals.

The apparatus 651 may be mounted adjacent a transport 696 that is operative to transport the sheet 650 along the sheet path 652 and into the detecting ranges of ultrasonic detector 654 at the first and second areas 690, 692 of the sheet path 652. As discussed in previous examples, the transport 696 may include belts, rollers or other suitable moving members that engage and move the sheet.

FIG. 30 shows the sheet 650 positioned at the first area 690 on the sheet path 652 and thus, located in the range of the first transmitter 660 and the receiver 664. In this position, the first transmitter 660 is operative to emit an ultrasonic signal that is guided by the waveguide 674 through the sheet, through the first branch 686 of the waveguide 684 and then to the receiver 664. In response to the received ultrasonic sound signals, the receiver 664 outputs signals to the circuit 730. The output signals of the receiver 664 includes information indicative of the interaction between the ultrasonic signal and the sheet 650 positioned at the first area 690. The output signals for example may indicate changes in acoustic impedance through the sheet path 652 as previously mentioned. The circuit 730 may be operative to determine the presence of the sheet 650 positioned at the first area 690 of the sheet path 652 in response at least in part to the output signals from the receiver 664 and data stored in the data store 638.

When this sheet 650 or another sheet is positioned at the second area 692 on the sheet path 652 as indicated by the phantom lines in FIG. 30, the sheet will be located in the range of the second transmitter 662 and the receiver 664. In this position, the second transmitter 662 is operative to emit an ultrasonic sound signal that is guided by the waveguide 694 through the sheet, through the second branch 688 of the waveguide 684 and then to the receiver 664. In response to the received ultrasonic sound signals, the receiver 664 outputs signals to the circuit 730. The output signals of the receiver 664 includes information indicative of the interaction between the ultrasonic signal and the sheet 650 positioned at the second area 692. The output signal for example may indicate changes in acoustic impedance through the sheet path 652 as previously mentioned. The circuit 730 may be operative to determine the presence of the sheet 650 positioned at the second area 692 of the sheet path 652 in response at least in part to the output signals from the receiver 664 and data stored in the data store 638.

In the embodiment shown in FIG. 30, the circuit 730 is operative to independently operate the first and second transmitters to transmit respective ultrasonic sound signals in order to determine the presence or absence of at least one sheet positioned at different times in the first and second areas in the sheet path responsive at least in part to respective first and second output signals from the receiver. In addition, (as discussed in previous embodiments) the circuit 730 may be operative to determine that the sheet in either or both of the first and second areas is either valid or suspect (counterfeit), corresponds to two or more overlapped sheets, corresponds to either a check or a currency, and/or has other properties and characteristics, responsive at least in part to the output signals from the receiver 664.

It should appreciated that the example embodiment shown in FIG. 30 enables the use of two transmitters and one receiver to carry out detection of sheets (and properties of sheets) in two different areas of a sheet transport. Alternative embodiments may include more branches in the waveguide 684 associated with the receiver 664 to enable more than two receivers and detection areas to use a single receiver to detect and/or evaluate properties of sheets. Also, it should be appreciated that alternative embodiments may be configured in an opposite manner, with more than one receiver in operative connection (through waveguides) with a single common ultrasonic sound transmitter. Such an alternative apparatus 678 is shown in FIG. 31

Figure 31:
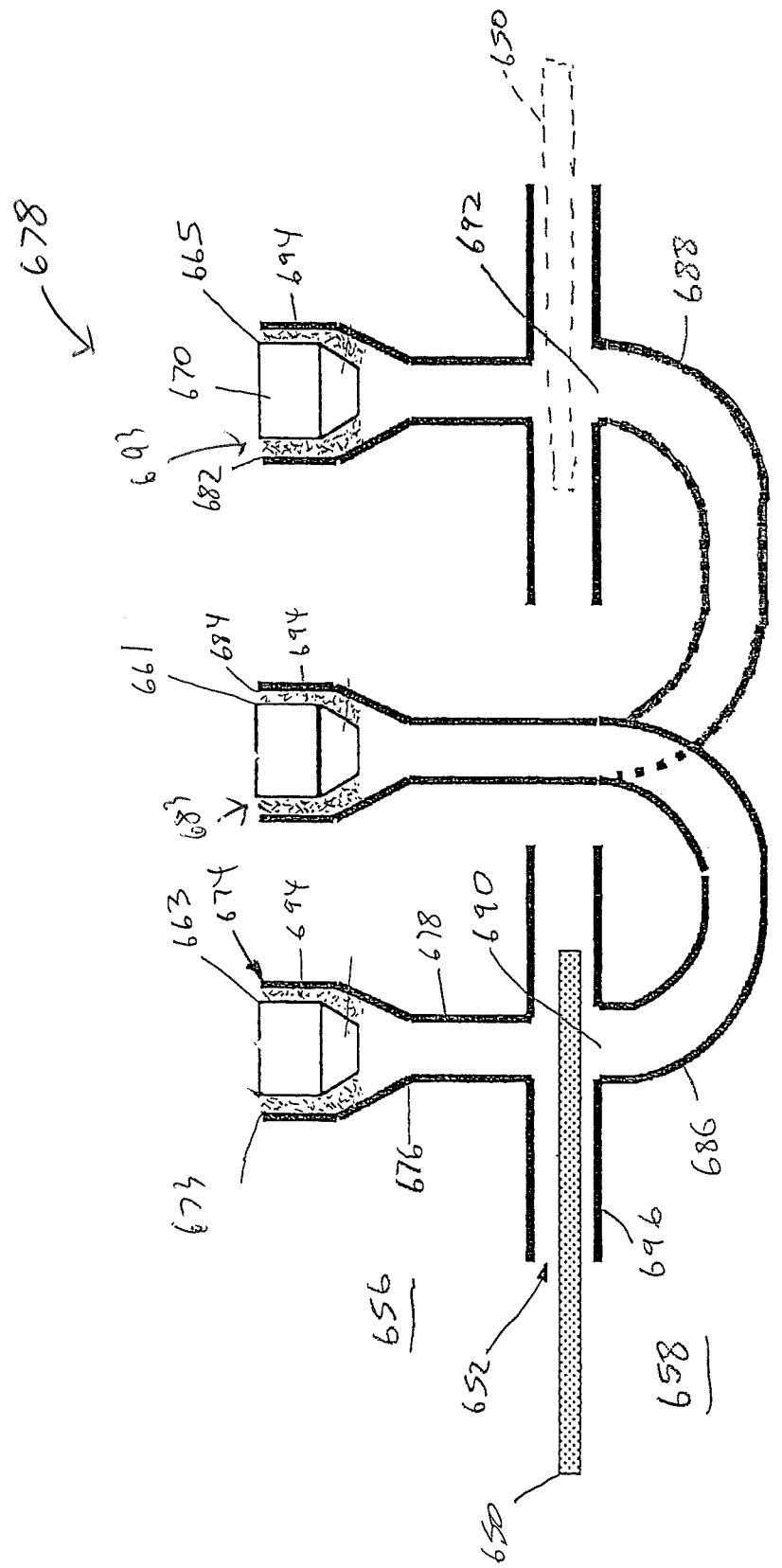
FIG. 31 is a schematic sectional view of a sheet path and related components with an ultrasonic detector positioned in a waveguide according to another exemplary embodiment.

For example, as illustrated in FIG. 31, the apparatus 678 may include a sheet detector 655 with the same configuration of waveguides 674, 684, 694 as described with respect to the sheet detector 654 in FIG. 30. However, the arrangement of the transmitter/receiver devices is different, such that a first transmitter 661 is mounted in and/or adjacent the end 683 of the waveguide 684 and such that first and second receivers 663, 665 are mounted in and/or adjacent to the respective ends 673, 693 of the waveguides 674, 694.

FIG. 31 also shows the sheet 650 positioned at the first area 690 in the sheet path 652 and thus, located in the range of the transmitter 661 and the receiver 663. In this position, the transmitter 661 is operative to emit an ultrasonic sound signal that is guided by the waveguide 684 through the first branch 686 of the waveguide 684, through the sheet 650 in the first area 690, through the waveguide 674 to the receiver 663. In response to the received ultrasonic sound signals, the receiver 663 outputs signals to the circuit 730. The output signals of the receiver 663 may include information indicative of the interaction between the ultrasonic signal and the sheet 650 positioned at the first area 690. The output signal for example may indicate changes in acoustic impedance through the sheet path 652 as previously mentioned. The circuit 730 may be operative to determine the presence of the sheet 650 positioned at the first area 690 of the sheet path 652 in response at least in part to the output signals from the receiver 663 and data stored in the data store 638.

When this sheet 650 or another sheet is positioned at the second area 692 on the sheet path 652 as indicated by the phantom lines in FIG. 31, the sheet will be located in the range of the transmitter 661 and the second receiver 665. In this position, the transmitter 661 is operative to emit an ultrasonic sound signal that is guided by the waveguide 684 through the second branch 688 of the waveguide 684, through the sheet 650 in the second area 692, through the waveguide 694 to the receiver 665. In response to the received ultrasonic sound signals, the receiver 664 outputs signals to the circuit 730. The output signals of the receiver 664 may include information indicative of the interaction between the ultrasonic signal and the sheet 650 positioned at the second area 692. The output signal for example may indicate changes in acoustic impedance through the sheet path 652 as previously mentioned. The circuit 730 may be operative to determine the presence of the sheet 650 positioned at the second area 692 of the sheet path 652 in response at least in part to the output signals from the receiver 665 and data stored in the data store 638.

Thus, in the embodiment shown in FIG. 31, the circuit 730 is operative to independently monitor the outputs from the first and second receivers in order to determine the presence or absence of at least one sheet positioned at different times in the first and second areas in the sheet path. In addition, (as discussed in previous embodiments) the circuit 730 may also be operative to determine that the sheet in either or both of the first and second areas is either valid or suspect (counterfeit), corresponds to two or more overlapped sheets, corresponds to either a check or a currency, and/or has other properties and characteristics, responsive at least in part to the output signals from the first and second receivers.

Waveguides may also be used in conjunction with other types of sheet detectors such as radiation transmission sensors or optical sensors. Also, the sheet path may include a number of ultrasonic detectors operatively connected to waveguides. Such detectors may sense areas that are transversely spaced relative to the direction of sheet movement or longitudinally spaced along the sheet path to detect the presence of sheets (or other properties of sheets) traveling along the sheet path. Waveguides may be operatively connected to these ultrasonic detectors to guide ultrasonic signals to their corresponding areas on the sheet path. Also, as discussed previously, embodiments may include wave guides with more than two branches.

Figure 33:
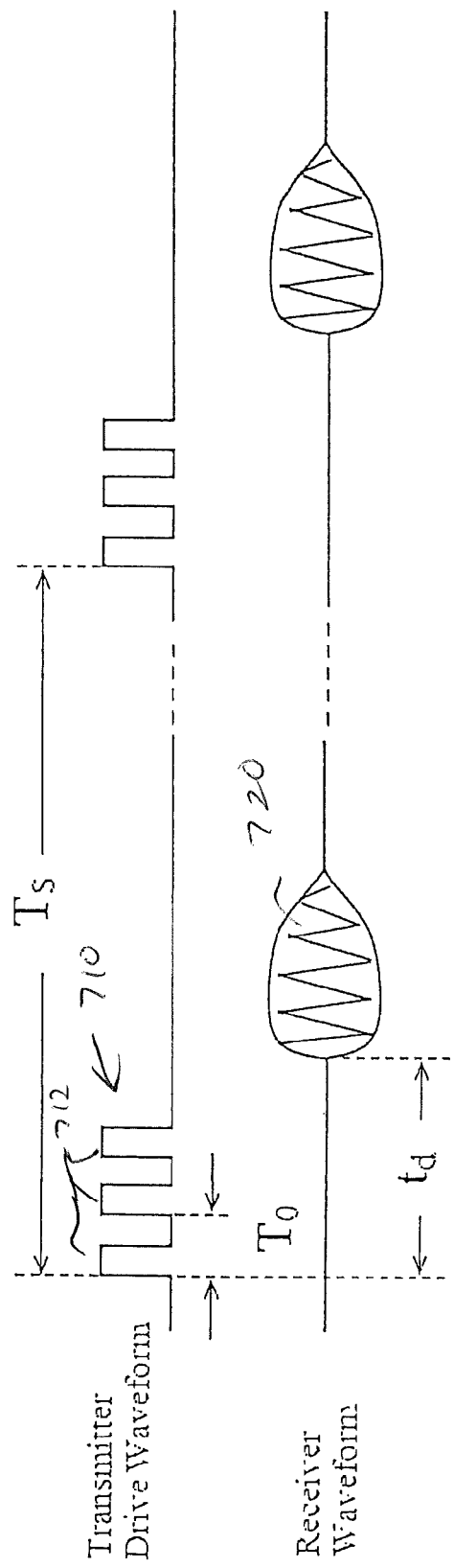
FIG. 33 is a graph showing examples of the waveforms and related timing of the ultrasonic detector of FIG. 32.

Referring to FIG. 32, example embodiments of the detection apparatuses 601, 651, 678 may include a drive circuit 700 operatively connected to each of the transmitters 603, 660, 661, 662, in the above mentioned exemplary embodiments. As shown in FIG. 33, the drive circuit may be operative to drive a transmitter to output ultrasonic signals in a burst 710 of a plurality of pulse 712 (e.g., periodic square waveform) having burst period $T_S$ between bursts. The drive strength in terms of pulse amplitude and number of pulses in each burst may be programmable via a processor 731 associated with the circuit 730 and may be varied/adjusted by the processor to compensate for a possible wide spread of sensitivity of the ultrasonic detectors.

The circuit 730 may be operative to cause the drive circuit to cause the transmitter to output the at least one first ultrasonic sound signal including a plurality (N) of ultrasonic sound signal pulses in a pulse train burst at a frequency ($f_0$) of pluses per second. In order to avoid or at least minimize directly coupled electronic noise and noise via waveguide conduction, the at least one waveguide may have a length (and values of $f_0$ and N may be used) such that at a temperature of zero degrees Celsius, a time delay ($T_d$) between the emission of a burst 710 of ultrasonic sound by the transmitter and the detection of the burst 720 by the receiver is greater than $N*1/f_0$. In a further embodiment, the detection apparatus may be configured such that the time delay ($T_d$) is also greater than $N*1/f_0+t_c$, where $t_c$ corresponds to the acoustic delay time from the ultrasonic transmitter to the ultrasonic receiver via the material (e.g., aluminum or other material in the walls) of the waveguide.

As shown in FIG. 32, the detection apparatuses 601, 651, 678 may also include a detection circuit 702 in operative connection with each receiver 605, 663, 664, 665. Such a detection circuit may be operative to sample the analog output of the receiver(s) to produce digital data usable to be evaluated by the at least one processor 731 included with the circuit 730.

It should be appreciated that in some embodiments the circuit 730 with the processor 731 may also include the drive circuit 700 and detection circuit 702 mounted on a common circuit board. However, in alternative embodiments the drive circuit 700 and/or the detection circuit 702 may correspond to circuit(s) that is/are separate from the processor 731 (mounted on a different circuit board and/or are remote from each other).

Exemplary embodiments of the detection circuit may also be configured to delay the digital sampling of the analog output of a receiver to take place at time periods in which there is a lower risk of sampling noise from conduction of the ultrasonic sound through the walls of the waveguide. Alternatively, the processor 731 may be programmed to discard/ignore any digitally sampled data by the detection circuit during the determined delay period that may include noise from conduction of the ultrasonic sound through the wall of the waveguide.

For example to approximate the amount of time to delay sampling (or the portion of the sample to discard/ignore), for a through beam detection apparatus (e.g. FIGS. 30, 31) having a 120 mm distance (D) along the waveguides (between a transmitter and a receiver), the following example parameters may be used:

$f_0$=40 kHz (sensor working frequency, implies a period of $T_0$=25 µs)

$N$=4 (number of pulses per burst)

$N*1/f_0 = N*T_0 = 4*25$ µs=100 µs=0.1 ms $t_c = D/V_{ALUM} = 120/6420 = 0.019$ ms (conduction time via waveguide)

$t_d$ (max at 0 C)=$D/V_{AIR}$=120/331.5=0.362 ms $t_d$ (min at 70 C)=$D/V_{AIR}$=120/(331.5+0.6*70)=0.321 ms $T_s$=1 ms (burst period, also as sampling interval)

In this example, noise from direct electric coupling (happening from 0 to $N*T_0$=0.1 ms) and from conduction (going from $t_c$=0.019 ms to $t_d$=0.119 ms) can be minimized by delaying sampling by the detection circuit 702 of the analog output signal from a receiver at a time period greater than the conduction time via the waveguide $(t_c)+N*T_0$ (e.g., greater than 0.119 ms) but before the ultrasonic sound signal travels via air to the receiver for a typical temperature for the apparatus (e.g., 0.321 ms). In this example a delay of 0.3 ms may be chosen to begin sampling outputs (and/or to begin evaluating in sampled data) from the receiver, after the drive circuit 700 causes the transmitter to emit each burst.

The sampled output signal may then be evaluated by the at least one processor 731 of the circuit 730 to determine the presence or absence of a sheet (or other properties of the sheet) in the area in the sheet path being monitored. In this example a delay closer to the arrival of the ultrasonic sound signal via air compared to the electronic conduction via conduction may be chosen, because the actual noise duration time of noise may be longer due to pulse responses of the receiver, delays in any sensor conditioning circuits, and/or delays caused by the air gaps between wave guides. Also, it should be appreciated that in alternative embodiments, other parameters may be chosen based on the configuration of the apparatus.

The exemplary embodiments including the sheet detector with the waveguide may be a reliable and cost effective way of detecting the presence of sheets or other properties of sheets positioned at areas on the sheet path. In particular, the ultrasonic detector may be used to detect sheets with clear view windows and/or clear material bands, which are common with plastic notes. The waveguide also allows both the transmitter and receiver to be on the same side of the sheet path, or even placed on the same circuit card for a through beam sensing configuration. Further, confinement of ultrasonic beam energy inside the waveguide minimizes interference from other (such as adjacent) transmitters (that may have relatively with wide beam angles of 60 degrees for example). Also, example embodiments may include a variety of waveguide branching to achieve multiple presence sensing with single transmitter to multiple receivers or a single receiver to multiple transmitters.

Thus the new automated banking machine and methods described herein achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the embodiments described herein are not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the embodiments included in the Abstract included herewith shall not be deemed to limit the embodiments to features described therein.

Having described the features, discoveries and principles of one or more example embodiments, the manner in which it is constructed and operated, and the advantages and useful results attained; the new and useful structures, devices, elements, arrangements, parts, combinations, systems, equipment, operations, methods and relationships are set forth in the appended claims.

What is claimed is:

1. Apparatus comprising:
  an automated banking machine that operates responsive at least in part to data read from data bearing records to cause financial transfers, including:
    a card reader operative to read card data from user cards, wherein the card data corresponds to financial accounts;
    at least one processor associated with the machine, wherein the at least one processor is in operative connection with the card reader, wherein the at least one processor is operative to cause:
      a computer determination to be made that card data read from a card corresponds to a financial account concerning which financial transfers are authorized to be conducted through machine operation; and
      a financial transfer at least one of to and from the financial account responsive at least in part to the determination;
    a sheet path, wherein the sheet path is operative to receive sheets;
    at least one waveguide;
    at least one transmitter,
      wherein the at least one transmitter is operative to emit at least one first ultrasonic sound signal through the at least one waveguide;
    at least one receiver,
      wherein the at least one waveguide is operative to guide the at least one first ultrasonic sound signal from the at least one transmitter to a first area in the sheet path, and from the first area in the sheet path to the at least one receiver,
wherein the at least one receiver is operative to output at least one first output signal responsive at least in part to a detection of the first ultrasonic sound signal in the at least one waveguide by the at least one receiver; and
at least one circuit including at least one processor, in operative communication with the at least one receiver and the at least one transmitter, wherein the at least one circuit is operative to determine at least one of a sheet presence and a property of at least one sheet positioned in the first area in the sheet path responsive at least in part to the at least one first output signal from the at least one receiver.

2. The apparatus according to claim 1, wherein the at least one circuit is operative to determine that the at least one sheet positioned in the first area in the sheet path corresponds to at least two overlapped sheets responsive at least in part to the at least one first output signal from the at least one receiver.

3. The apparatus according to claim 1, wherein the at least one circuit is operative to determine that the at least one sheet positioned in the first area in the sheet path corresponds to a counterfeit sheet of currency, responsive at least in part to the at least one first output signal from the at least one receiver.

4. The apparatus according to claim 1, wherein the at least one circuit is operative to determine that the at least one sheet positioned in the first area in the sheet path corresponds to either a currency note or a check, responsive at least in part to the at least one first output signal from the at least one receiver.

5. The apparatus according to claim 1, wherein the at least one waveguide includes a first waveguide, wherein the first waveguide includes a first end and a second end, further comprising:
a first material that is operative to dampen the at least one first ultrasonic sound signal,
wherein both the at least one transmitter and the at least one receiver are positioned within the first end of the first waveguide, wherein the first area in the sheet path is positioned between the first material and the second end of the first waveguide.

6. The apparatus according to claim 1, wherein the at least one waveguide includes a first waveguide, and a second waveguide,
wherein the first waveguide includes a first end and a second end,
wherein the second waveguide includes a first end and a second end,
wherein the at least one transmitter is positioned to emit the first ultrasonic sound signal into the first end of the first waveguide,
wherein the at least one receiver is positioned to detect the first ultrasonic sound signal at the first end of the second waveguide,
wherein the first area in the sheet path is positioned between the second end of the first waveguide and the second end of the second waveguide.

7. The apparatus according to claim 1, wherein the sheet path includes a second area spaced apart from the first area, further comprising a sheet transport that is operative to move sheets through the sheet path from the first area to the second area,
wherein the at least one waveguide includes a first waveguide, a second waveguide, and a third waveguide,
wherein the first waveguide includes a first end and a second end,
wherein the third waveguide includes a first end and a second end,
wherein the second waveguide includes a first end adjacent a first passageway that splits into first and second branches that include respective separate passageways and respective second and third ends of the second waveguide,
wherein the first area of the sheet path is positioned between the second end of the first waveguide and the second end of the second waveguide,
wherein the second area of the sheet path is positioned between the second end of the third waveguide and the third end of the second waveguide,
wherein the at least one receiver is positioned adjacent at least one of the first ends of the first, second and third waveguides,
wherein the at least one transmitter is positioned adjacent at least one of the first ends of the first, second and third waveguides,
wherein the at least one circuit is operative to determine at least one of a sheet presence or at least one property of a sheet positioned in the second area in the sheet path responsive at least in part to at least one second output signal from the at least one receiver.

8. The apparatus according to claim 7, wherein the at least one transmitter includes a first transmitter and a second transmitter,
wherein the first transmitter is positioned adjacent the first end of the first waveguide and is operative to emit the first ultrasonic sound signal through the first waveguide,
wherein the second transmitter is positioned adjacent the first end of the third waveguide and is operative to emit a second ultrasonic sound signal through the third waveguide,
wherein the at least one receiver is positioned adjacent the first end of the second waveguide,
wherein the at least one receiver is operative to detect the at least one first ultrasonic sound signal that is emitted by the first transmitter and that passes through the first area and through the first branch of the second waveguide to the at least one receiver,
wherein the at least one receiver is operative to detect the at least one second ultrasonic sound signal that is emitted by the second transmitter and that passes through the second area and through the second branch of the second waveguide to the at least one receiver,
wherein the at least one circuit is operative to independently operate the first and second transmitters to emit the respective at least one first and the at least one second ultrasonic sound signals in order to determine at least one of a sheet presence and at least one property of at least one sheet positioned at different times in the first and second areas in the sheet path responsive at least in part to the respective first and second output signals from the at least one receiver.

9. The apparatus according to claim 7, wherein the at least one transmitter is positioned adjacent the first end of the second waveguide,
wherein the at least one transmitter is operative to emit the at least one first ultrasonic sound signal through the first passageway and into each of the first and second branches of the second waveguide,
wherein the at least one receiver includes a first receiver and a second receiver,
wherein the first receiver is positioned in first end of the first waveguide and is operative to detect a first portion of the at least one first ultrasonic sound signal that passes through the first branch of the second waveguide, through the first area, and through the first waveguide to the first receiver, wherein the first receiver is operative to output the at least one first output signal responsive at least in part to a detection of the first portion of the at least one first ultrasonic sound signal by the first receiver, wherein the second receiver is positioned in the first end of the third waveguide and is operative to detect a second portion of the at least one first ultrasonic sound signal that passes through the second branch of the second waveguide, through the second area, and through the third waveguide to the second receiver, wherein the second receiver is operative to output at least one second output signal responsive at least in part to a detection of the second portion of the at least one first ultrasonic sound signal by the second receiver, wherein the at least one circuit is operative to independently monitor the first and second outputs from the respective first and second receivers in order to determine at least one of a sheet presence or at least one property of at least one sheet positioned at different times in the first and second areas in the sheet path.

10. The apparatus according to claim 1, further comprising a first material positioned inside the at least one waveguide adjacent at least one of the at least one receiver and the at least one transmitter, wherein the first material is operative to dampen ultrasonic sound signals.

11. The apparatus according to claim 1 further comprising at least one drive circuit operatively connected to the at least one transmitter, wherein the at least one circuit is operative to cause the at least one drive circuit to cause the at least one transmitter to output a burst of the at least one first ultrasonic sound signal including a plurality (N) of ultrasonic sound signal pulses in a pulse train at a frequency ($f_0$) of pluses per second during the burst, wherein the at least one waveguide has a length such that at a temperature of zero degrees Celsius, a time delay ($T_d$) between the emission of the burst of the at least one first ultrasonic sound signal by the at least one transmitter and a detection of the burst of the at least one first ultrasonic sound signal by the at least one receiver is greater than $N*1/f_0$.

12. The apparatus according to claim 11, further comprising a detection circuit operatively connected with the at least one receiver, wherein the at least one receiver is operative to emit an analog signal responsive to the detection of the burst of the at least one ultrasonic sound signal, where in the detection circuit is operative to sample the analog signal and is operative to produce the output signal responsive at least in part to the sampled analog signal, wherein the detection circuit is operative to delay sampling the analog signal for a time period after the drive circuit begins causing the at least one transmitter to emit the burst of the at least one ultrasonic sound signal.

13. The apparatus according to claim 12, wherein the time period of the delay is greater than a conduction time via the walls of the waveguide ($t_c$)+$N*1/f_0$.

14. The apparatus according to claim 1, wherein the at least one transmitter is operative to output the at least one first ultrasonic sound signal with a beam angle of greater than 45 degrees.

15. The apparatus according to claim 1 and further comprising:
at least one data store is in operative connection with the at least one circuit, wherein the at least one data store includes sheet data corresponding to at least one output signal corresponding to at least one sheet positioned at the first area in the sheet path, wherein the at least one circuit is operative to determine at least one of a sheet presence and at least one property of at least one sheet in the first area in the sheet path, responsive at least in part to the at least one output signal and the sheet data.

16. Apparatus comprising:
an automated banking machine that operates responsive at least in part to data read from data bearing records to cause financial transfers, including:
a card reader operative to read card data from user cards, wherein the card data corresponds to financial accounts;
at least one processor associated with the machine, wherein the at least one processor is in operative connection with the card reader, wherein the at least one processor is operative to cause:
a computer determination to be made that card data read from a card corresponds to a financial account concerning which financial transfers are authorized to be conducted through machine operation; and
a financial transfer at least one of to and from the financial account responsive at least in part to the determination;
a first area in a sheet path and a second area in the sheet path that is spaced apart from the first area, wherein the first and second areas are operative to receive sheets therethrough;
at least one waveguide, wherein the at least one waveguide includes a common pathway that splits into a first branch and a second branch including separated pathways;
a first transmitter,
wherein the first transmitter is positioned to emit at least one first ultrasonic sound signal through the first area and into the first branch of the at least one waveguide;
a second transmitter,
wherein the second transmitter is positioned to emit at least one second ultrasonic sound signal through the second area and into the second branch of the at least one waveguide;
at least one receiver,
wherein the at least one receiver is positioned to detect the first and second ultrasonic sound signals in the common pathway of the at least one waveguide,
wherein the at least one receiver is operative to output respective first and second output signals responsive to the detected first and second ultrasonic sound signals; and
at least one circuit including at least one processor, in operative communication with the at least one receiver and the first and second transmitters, wherein the at least one circuit is operative to independently operate the first and second transmitters to emit the respective first and second ultrasonic sound signals in order to determine at least one of a sheet presence and at least one property of at least one sheet positioned at different times in the first and second sheet areas in the sheet path responsive at least in part to the respective first and second output signals from the at least one receiver.

17. The apparatus according to claim 16, wherein the at least one circuit is operative to determine that the at least one sheet positioned in at least one of the first and second areas in the sheet path corresponds to at least two overlapped sheets responsive at least in part to at least one of the first and second output signals from the at least one receiver.

18. The apparatus according to claim 16, wherein the at least one circuit is operative to determine that the at least one sheet positioned in at least one of the first and second areas in the sheet path corresponds to a counterfeit sheet of currency, responsive at least in part to at least one of the first and second output signals from the at least one receiver.

19. The apparatus according to claim 16, wherein the at least one circuit is operative to determine that the at least one sheet positioned in at least one of the first and second areas in the sheet path corresponds to either a currency note or a check, responsive at least in part to at least one of the first and second output signals from the at least one receiver.

20. Apparatus comprising:
- an automated banking machine that operates responsive at least in part to data read from data bearing records to cause financial transfers, including:
    - a card reader operative to read card data from user cards, wherein the card data corresponds to financial accounts;
    - at least one processor associated with the machine, wherein the at least one processor is in operative connection with the card reader, wherein the at least one processor is operative to cause:
        - a computer determination to be made that card data read from a card corresponds to a financial account concerning which financial transfers are authorized to be conducted through machine operation; and
        - a financial transfer at least one of to and from the financial account responsive at least in part to the determination;
    - a first area in a sheet path and a second area in the sheet path that is spaced apart from the first area, wherein the first and second areas are operative to receive sheets therethrough;
    - at least one waveguide, wherein the at least one waveguide includes a common pathway that splits into a first branch and a second branch including separated pathways;
    - a first transmitter,
        - wherein the first transmitter is positioned to emit at least one first ultrasonic sound signal through the first area and into the first branch of the at least one waveguide;
    - a second transmitter,
        - wherein the second transmitter is positioned to emit at least one second ultrasonic sound signal through the second area and into the second branch of the at least one waveguide;
    - at least one receiver,
        - wherein the at least one receiver is positioned to detect the first and second ultrasonic sound signals in the common pathway of the at least one waveguide,
        - wherein the at least one receiver is operative to output respective first and second output signals responsive to the detected first and second ultrasonic sound signals; and
    - at least one circuit including at least one processor, in operative communication with the at least one receiver and the first and second transmitters, wherein the at least one circuit is operative to independently operate the first and second transmitters to emit the respective first and second ultrasonic sound signals in order to determine at least one of a sheet presence and at least one property of at least one sheet positioned at different times in the first and second sheet areas in the sheet path responsive at least in part to the respective first and second output signals from the at least one receiver;
- at least one data store is in operative connection with the at least one circuit, wherein the at least one data store includes sheet data,
    - wherein the at least one circuit is operative responsive at least in part to the sheet data to at least one of:
        - determine that the at least one sheet positioned in at least one of the first and second areas in the sheet path corresponds to at least two overlapped sheets responsive at least in part to at least one of the first and second output signals from the at least one receiver;
        - determine that the at least one sheet positioned in at least one of the first and second areas in the sheet path corresponds to a counterfeit sheet of currency, responsive at least in part to at least one of the first and second output signals from the at least one receiver; and
        - determine that the at least one sheet positioned in at least one of the first and second areas in the sheet path corresponds to either a currency note or a check, responsive at least in part to at least one of the first and second output signals from the at least one receiver,
    - wherein the at least one circuit is operative to cause at least one of the first and second transmitters to output at least one burst of the respective first and second ultrasonic sound signals including a plurality (N) of ultrasonic sound signal pulses in a pulse train at a frequency ($f_o$) of pluses per second during the at least one burst,
    - wherein the at least one receiver is operative to emit at least one analog signal responsive to a detection of the at least one burst of the respective first and second ultrasonic sound signals, wherein the at least one circuit is operative to sample the at least one analog signal and is operative to produce at least one of the respective first and second output signals responsive at least in part to the sampled at least one analog signal.

* * * * *